United States Patent
Pike et al.

(10) Patent No.: US 8,302,743 B2
(45) Date of Patent: Nov. 6, 2012

(54) SUPPORT FOR SUPPORTING A STRUCTURE ON A SURFACE

(75) Inventors: Antony Lawrence Pike, Queens Park (AU); Duncan B. Gilmore, Eight Mile Plains (AU); Raymond L. Hope, Eight Mile Plains (AU)

(73) Assignee: Flat Pty Ltd, Queens Park, NSW (AU)

( * ) Notice: Subject to any disclaimer, the term of this patent is extended or adjusted under 35 U.S.C. 154(b) by 1258 days.

(21) Appl. No.: 10/588,545

(22) PCT Filed: Aug. 16, 2005

(86) PCT No.: PCT/AU2005/001226
§ 371 (c)(1),
(2), (4) Date: Mar. 7, 2008

(87) PCT Pub. No.: WO2006/017891
PCT Pub. Date: Feb. 23, 2006

(65) Prior Publication Data
US 2008/0190696 A1 Aug. 14, 2008

(30) Foreign Application Priority Data

Aug. 16, 2004 (AU) .............................. 2004904616
Mar. 24, 2005 (AU) .............................. 2005901474

(51) Int. Cl.
*B60T 11/00* (2006.01)
(52) U.S. Cl. .................... 188/151 R; 188/300; 267/118; 60/414; 92/52; 248/404
(58) Field of Classification Search ............. 188/151 R, 188/300; 267/113, 118; 60/414, 415; 91/5, 91/169; 92/52; 248/162.1, 404
See application file for complete search history.

(56) References Cited

U.S. PATENT DOCUMENTS

| | | | | |
|---|---|---|---|---|
| 2,992,836 A | * | 7/1961 | Vogel | 267/64.19 |
| 3,560,033 A | * | 2/1971 | Barkus | 403/107 |
| 3,825,244 A | * | 7/1974 | Bauer | 267/124 |
| 3,865,341 A | * | 2/1975 | Fortnam et al. | 248/404 |
| 4,415,135 A | * | 11/1983 | French | 248/161 |

(Continued)

FOREIGN PATENT DOCUMENTS

CH 663 338 A5 12/1987

(Continued)

OTHER PUBLICATIONS

Japan Patent Office Notice of Reasons for Refusal for Japanese Patent Application No. 526118/2007 dated Jul. 29, 2010, English Translation, 5 pages.

(Continued)

*Primary Examiner* — Pamela Rodriguez
(74) *Attorney, Agent, or Firm* — Fitch, Even, Tabin & Flannery, LLP

(57) ABSTRACT

A support for supporting a structure on a surface, comprising at least one support element, each support element comprising a piston, a cylinder in which the piston is moveable, and a brake for maintaining the piston in a position that is stable relative to the cylinder, wherein the piston and the cylinder are arranged so that a loading associated with the structure effects an adjustment of the support element, and wherein an increase in hydraulic pressure within the cylinder, effected by the loading associated with the structure, activates the brake.

32 Claims, 21 Drawing Sheets

U.S. PATENT DOCUMENTS

| | | | |
|---|---|---|---|
| 5,044,468 A | 9/1991 | Worthington, Jr. | |
| 6,272,853 B1 | 8/2001 | Broechmann | |

FOREIGN PATENT DOCUMENTS

| | | |
|---|---|---|
| DE | 41 19 762 A1 | 12/1992 |
| DE | 297 10 550 U1 | 8/1997 |
| DE | 100 17 636 A1 | 10/2000 |
| GB | 1 315 833 A | 5/1973 |
| GB | 2 340 529 A | 2/2000 |
| GB | 2 375 343 A | 11/2002 |
| JP | 57-083704 A | 5/1982 |
| JP | 61-023683 Y2 | 7/1986 |
| JP | 62-046255 U | 3/1987 |
| JP | 03-047552 U | 5/1991 |
| WO | 99/55197 A1 | 11/1999 |

OTHER PUBLICATIONS

Japan Patent Office Notice of Reasons for Refusal for Japanese Patent Application No. 526118/2007 dated Jul. 27, 2011, English Translation, 4 pages.

* cited by examiner

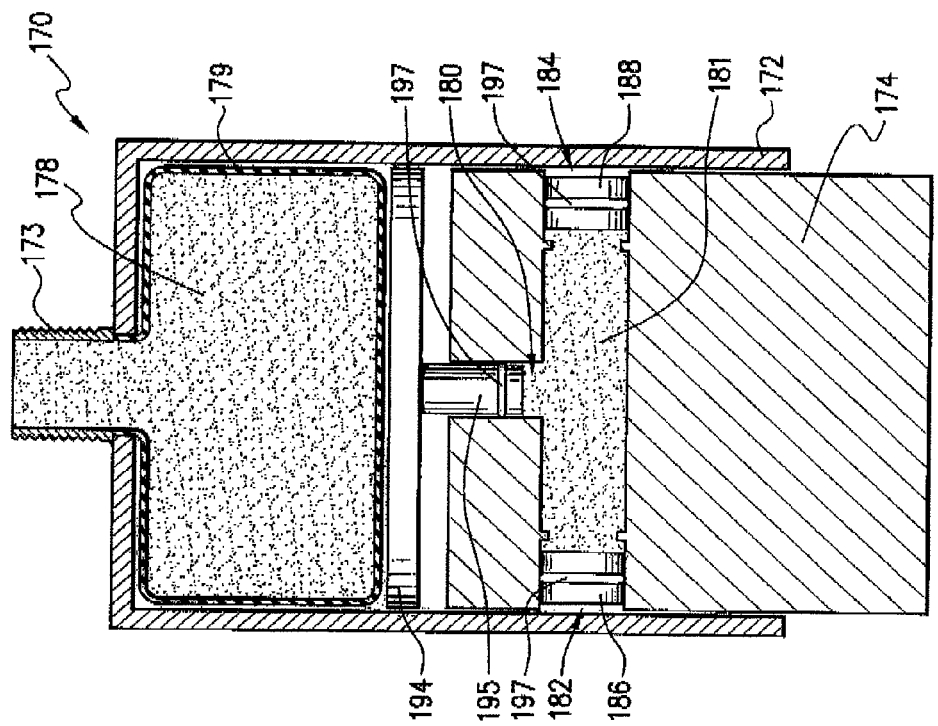
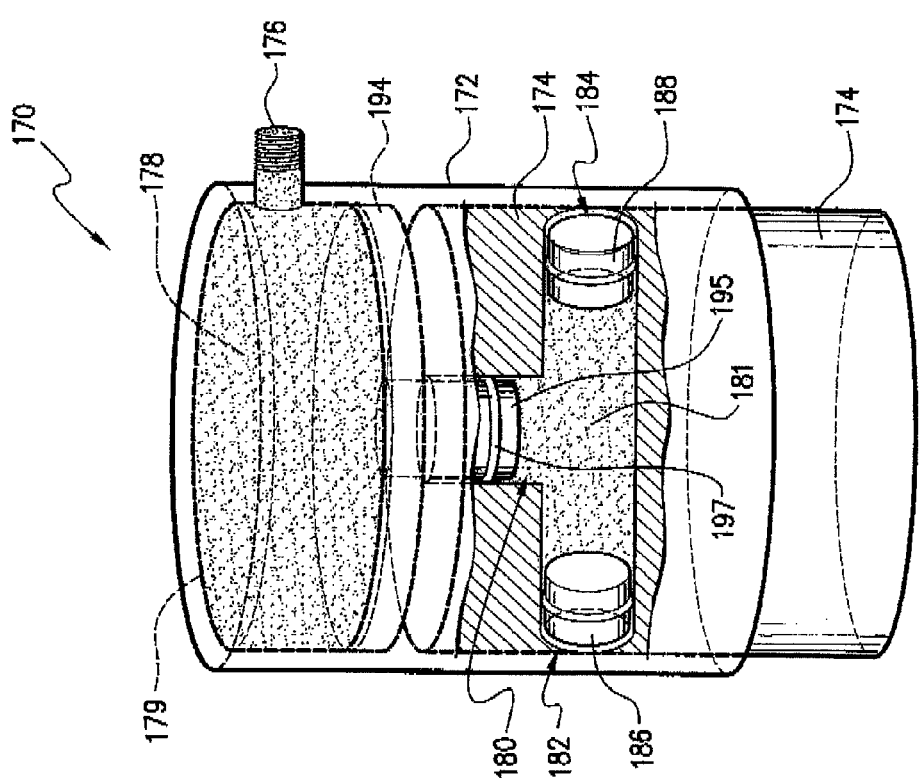
Fig. 13
Fig. 12

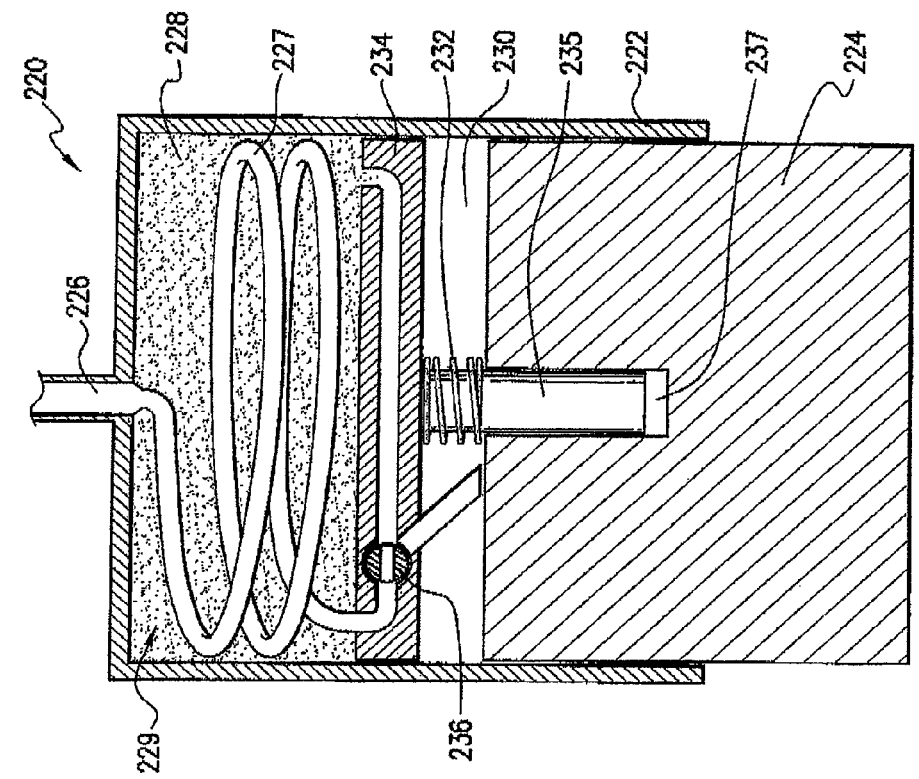
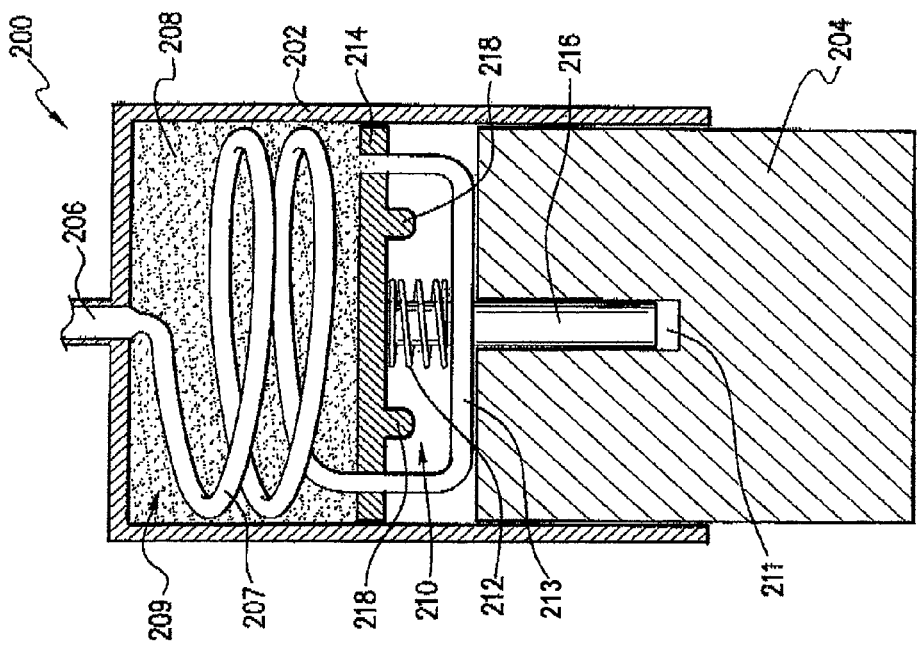
Fig. 17
Fig. 18

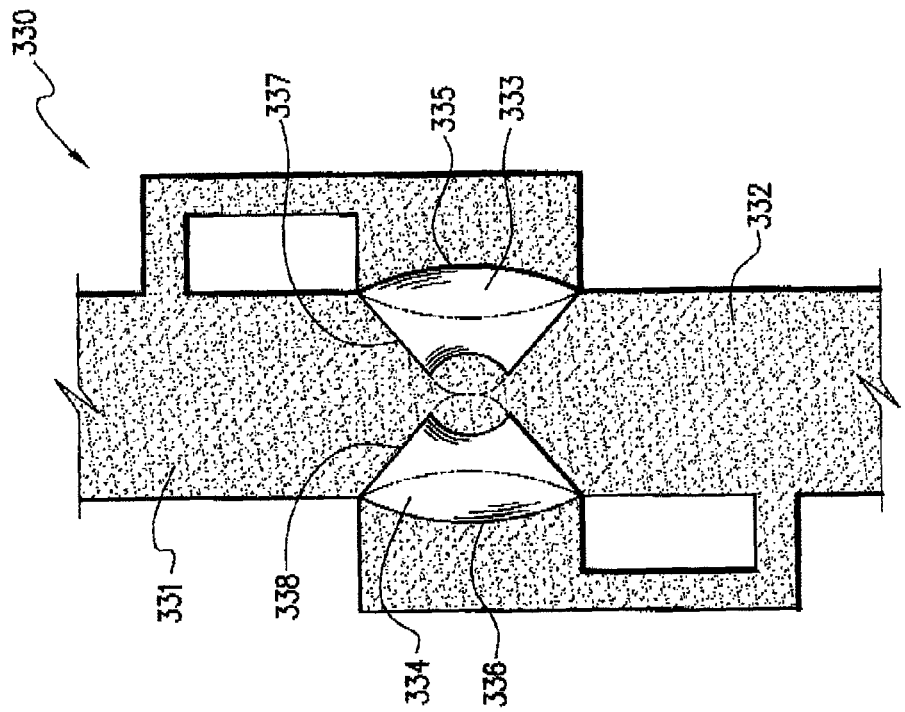
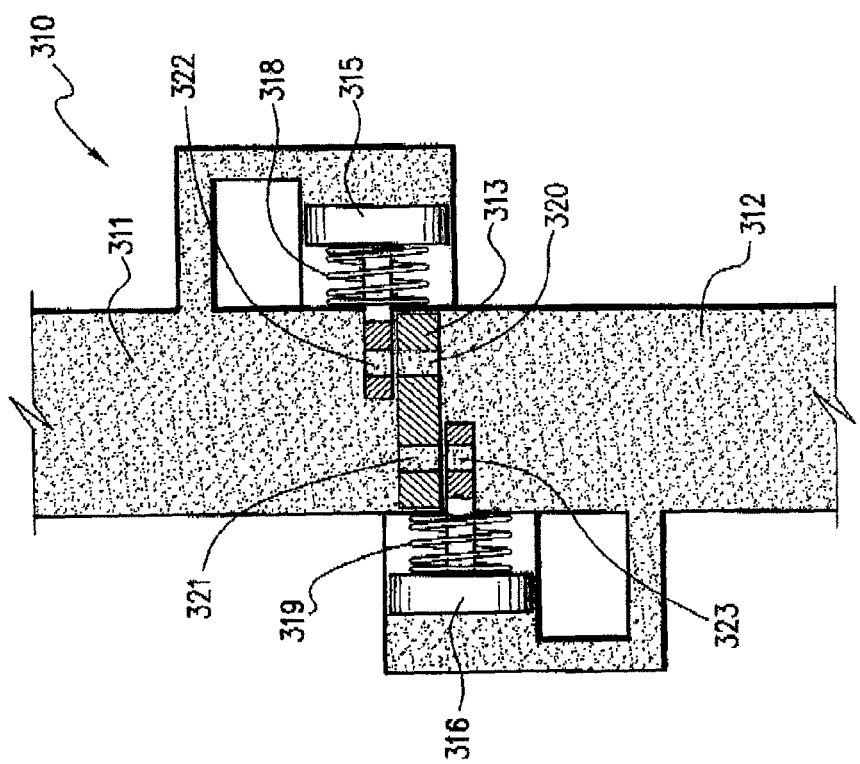
Fig. 24
Fig. 23

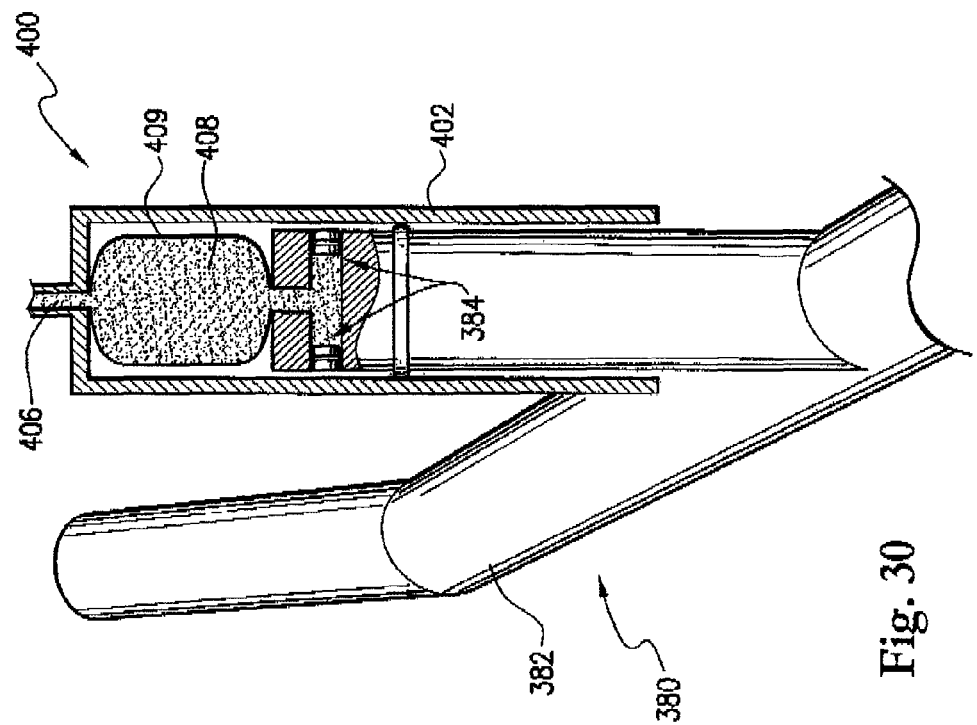
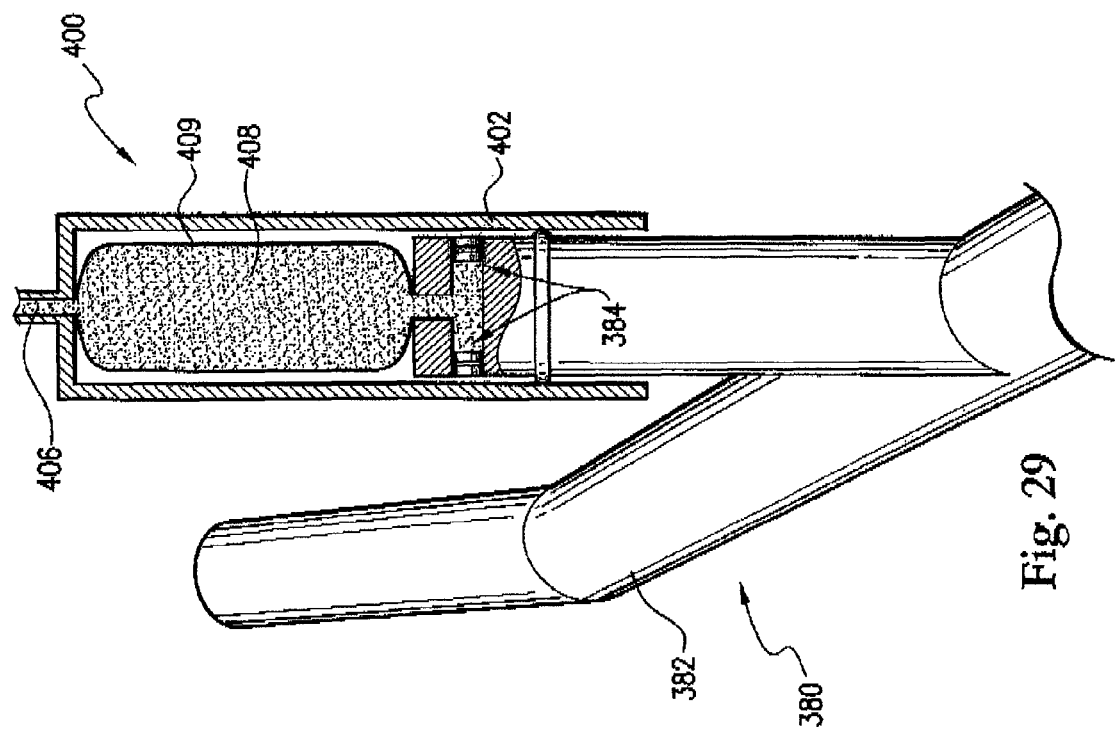

SUPPORT FOR SUPPORTING A STRUCTURE ON A SURFACE

FIELD OF THE INVENTION

The present invention broadly relates to a support for supporting a structure on a surface, for example, to a support having at least two self-adjusting support elements.

BACKGROUND OF THE INVENTION

Structures such as tables, ladders and tripods have legs for positioning on a surface. If not all of the legs contact the surface, the position of the structure will be unstable. The position of the structure can be made more stable by adjusting the heights of individual legs. This is often done with a screw-type mechanism commonly found at the bottom of the legs.

Alternatively, all of the legs may be in contact with the surface but the structure may not have a desired orientation relative to the surface. Again, the position of the structure relative to the surface may be adjusted by adjusting the height of the individual legs with the same type of screw mechanism. Other structures such as large machines and houses may contact the ground directly without legs or through supporting beams or a base plate. Level or tilt adjustment of these large structures typically is done with individually controlled jacks or wedges.

In any case the adjustment of the position of the structure typically is cumbersome and time consuming. There is a need for a technically advanced solution.

Pistons have been utilised to stabilise structures such as ladders, tripods and tables. Generally one piston is associated with each leg of the structure. The pistons are in fluid communication. Thus the pistons can be utilised to together adjust the position of individual support legs. When the position of the structure is considered stable the pistons are manually isolated so no further adjustment occurs. These systems do not provide self-adjusting support.

SUMMARY OF THE INVENTION

The present invention provides in a first aspect a support for supporting a structure on a surface, the support comprising at least one support element, the or each support element comprising:
 a piston,
 a cylinder in which the piston is moveable, and
 a braking means for maintaining the piston in a position that is stable relative to the cylinder,
wherein the piston and the cylinder are arranged so that a loading associated with the structure effects an adjustment of the support element,
and wherein an increase in hydraulic pressure within the cylinder effected by the loading associated with the structure activates the braking means.

The or each cylinder typically has a fluid inlet/outlet and typically is arranged so that an amount of fluid flowing through the inlet/outlet controls the movement of the or each piston relative to the or each cylinder. The or each cylinder typically has an opening positioned so that in use the movement of the or each piston effects a movement of a surface contact portion of the or each support element relative to the surface.

The support typically has at least two support elements. In this case the fluid inlet/outlets typically are interconnected by at least one fluid conduit so that the fluid can flow between the inlet/outlets. The support typically is arranged so that in use, when the support is placed on the surface and at least one of the surface contact portions does not contact the surface, a movement of the pistons relative to the cylinders is effected that adjusts the positions of the surface contact portions relative to the surface.

The support typically is self-adjusting which has a significant practical advantage. For example, the structure with support may be placed on the surface and at least one of the surface contact portion may contact the surface while at least one other contact portion may not contact the surface. The surface may be uneven or the structure may be placed on the surface in an angled position. The structure typically is arranged so that the or each piston associated with the surface contact portion that contacts the surface moves inwardly and typically pushes fluid into the or each cylinders associated with the or each other contact portion that does not contact the surface which typically effects movement of each contact portion.

Alternatively, all contact portions may contact the surface but the structure may be tilted to, for example, the rear of the structure. In this case the loading on the or each rear support element would increase and the loading on the or each front support element would decrease. The support is typically arranged so that the or each piston associated with the increased loading moves inwardly and typically pushes fluid into the or each cylinder associated with the or each support element associated with the decreased loading.

The support typically is arranged so that, after adjustment and if all contact portions contact the surface, the loading on the support elements effects an increase in hydraulic pressure within the or each cylinder which actuates the braking means and inhibits movement of the pistons so that the structure is in an adjusted and stable position.

In one embodiment each piston comprises the surface contact portion arranged to contact the surface. Alternatively, the surface contact portion may be a component that is either in direct or indirect contact with the piston and that may be positioned so that a movement of the pistons relative to the cylinder effects a movement of the surface contact portions.

In a variation of this embodiment each cylinder may comprise a surface contact portion arranged to contact the surface. Alternatively, the surface contact portion may be a component that is either in direct or indirect contact with the cylinder and that may be positioned so that a movement of the cylinder relative to the pistons effects a movement of the surface contact portions.

In a specific embodiment the support is arranged so that the pistons move relative to the cylinders, until an increase of pressure in the cylinders actuates the braking means. For example, this may be the case when the pressure in all cylinders has the same level.

The braking means of each support element may be hydraulic. For example, the piston of each support element may have a cavity arranged so that in use fluid can penetrate from the inlet/outlet into the cylinder and into the cavity. In one specific embodiment of the present invention the piston is elongate and at least one side portion has at least one recess that is linked to the cavity. A brake-pad or brake-cylinder typically is positioned in the or each recess of the piston and arranged so that, if fluid penetrates into the cavity, the or each brake-pad or brake-cylinder is in use moved towards an interior wall of the cylinder. In this case the braking means typically is arranged so that an increase of the fluid pressure in the cavity increases the pressure of the or each brake-pad or brake-cylinder against the interior wall of the cylinder and thereby acts against the moveability of the piston in the cylinder.

In a variation of this embodiment the cylinder may have at least one recess in an interior side wall. The or each brake pad or brake cylinder may be positioned in the or each recess of the interior side wall and arranged to push against the piston.

The braking means of each support element may also be mechanical. For example, the support element may comprise a brake portion which typically is moveable relative to the cylinder and with the piston until the movement of the surface contact portion is restricted, for example by contact with the surface. For example, the brake portion may be the surface contact portion. In this case the piston and brake portion may be arranged so that, when the movement of the brake portion is restricted, a further movement of the piston relative to the cylinder activates the braking means. For example, the braking means may be arranged so that a movement of the brake portion against an interior wall of the cylinder may be effected. In this case the piston and the braking means may have wedging portions which in use effect the movement of the brake portion against the interior wall of the cylinder. Further, the brake portion may have one or more teeth on an exterior portion that are arranged to interlock with one or more teeth on the interior wall of the cylinder if the brake portion is pushed against the interior wall of the cylinder.

In one embodiment of the present invention the support comprises a reservoir for the fluid that is interconnected with the fluid inlet/outlets and that is in use typically positioned above the cylinders. The cylinders and fluid inlet/outlets are typically connected so that a closed system is formed which may comprise the reservoir.

The support may also comprise a valve arranged to receive a hydraulic liquid. In this case the support is typically arranged so that, when the valve is opened and the hydraulic liquid is pumped into the support, the or each support element lifts the structure from a first level to a second level.

For example, the structure may be a furniture item such as a table, building such as a house, or any other structure that may be placed on a surface including airborne vehicles. The structure typically has three or four support elements, but may alternatively have any number of support elements.

The present invention provides in a second aspect an adjustable support for supporting a structure on an underlying surface, the support comprising a piston cylinder assembly, the piston being moveable relative to the cylinder, with one of the piston or cylinder being connected to, or forming part of, the structure and the other being associated with a contact portion operative to engage the underlying surface, and braking means for inhibiting movement of the piston relative to the cylinder, wherein the braking means is operative in response to the application of predetermined loading conditions to a portion of the support.

The present invention provides in a third aspect a braking system for a piston and cylinder assembly, the braking system comprising a braking means adapted to be actuated by an increase in fluid pressure within the cylinder.

In one embodiment of the third aspect the piston has a cavity arranged so that in use fluid can penetrate from an inlet/outlet into the cylinder and into the cavity and wherein at least one side portion of the piston has at least one recess that is linked to the cavity. In this embodiment a brake-pad or brake-cylinder is positioned in the or each recess of the piston and arranged so that if fluid penetrates into the cavity the or each brake-pad or brake-cylinder is in use moved towards an interior wall of the cylinder. The braking means may then be arranged so that an increase of the fluid pressure in the cavity increases the pressure of the or each brake-pad or brake-cylinder against the interior wall of the cylinder and thereby acts against the moveability of the piston in the cylinder.

In a second embodiment of the third aspect the braking system includes a cavity separating a piston plate from the piston. The cavity may contain resistance means such that in use the piston plate and piston are retained in a distal position relative to one another and on an increase in fluid pressure within the cylinder the piston plate and piston move proximal to one another, actuating braking means. The cavity further contains at least one inlet/outlet extension extending through at least a portion of the cavity so that in use fluid can penetrate from an inlet/outlet into the inlet/outlet extension and into the cylinder, and means for disrupting penetration of fluid through the inlet/outlet extension and into the cylinder upon an increase in fluid pressure within the cylinder, actuating braking of the piston relative to the cylinder.

In one form the resistance means comprises a spring or a fluid-filled bladder.

In one form the inlet/outlet extension comprises a tube extending through the cavity and into the cylinder.

In one form the tube is flexible and at least one of the piston plate and piston comprises crimpers extending into the cavity such that when the fluid pressure in the cylinder increases and the piston plate and piston move proximal to one another the crimpers compress the flexible tube and disrupt fluid flow into the cylinder.

In another form the tube includes a valve such that when the fluid pressure in the cylinder increases and the piston plate and piston move proximal to one another the valve disrupts fluid flow through the tube and into the cylinder.

In one form the tube includes a first member extending therethrough and the cavity contains a second member, the first member including a flow aperture to allow fluid penetration through the tube, the second member being adapted to move between an open position and a closed position such that in the closed position the flow aperture is blocked by the second member, disrupting fluid penetration through the tube and into the cylinder.

In one form the inlet/outlet extension comprises a helical flexible tube portion extending through at least a portion of the cylinder.

In a further embodiment of the third aspect the braking means is situated between two or more support elements and comprises at least two fluid reservoirs adapted such that, when the pressure in at least one fluid reservoir is below a threshold level, the fluid reservoirs are in fluid communication and, when the pressure in all fluid reservoirs is above a threshold level, the fluid reservoirs are not in fluid communication.

In a fourth aspect, the present invention provides a support for supporting a structure on a surface, the support comprising at least one support element, the or each support element comprising a piston, a cylinder in which the piston is moveable, and a braking means for maintaining the piston in a position that is stable relative to the cylinder, wherein the piston and the cylinder are arranged so that a loading associated with the structure effects an adjustment of the support element, and wherein the loading associated with the structure activates the braking means if the moveability of a surface contact portion of the support element is reduced below a threshold value.

BRIEF DESCRIPTION OF THE DRAWINGS

FIG. 12 shows a schematic representation of the support element for supporting a structure of FIG. 12, FIG. 13 shows a schematic representation of the support element for supporting a structure of FIG. 12, FIG. 17 shows a schematic representation of a support element for supporting a structure according to an embodiment of the present invention, FIG. 18 shows a schematic representation of a ball valve of the support element for supporting a structure of FIG. 17, FIG. 23 shows a schematic representation of a valve element according to an embodiment of the present invention, FIG. 24 shows a schematic representation of a valve element according to an embodiment of the present invention, FIG. 29 shows a cross-sectional representation of a support system of one embodiment of the disclosure, and FIG. 30 shows a cross-sectional representation of a support system of FIG. 29.

DETAILED DESCRIPTION OF SPECIFIC EMBODIMENTS

Figure 1A:
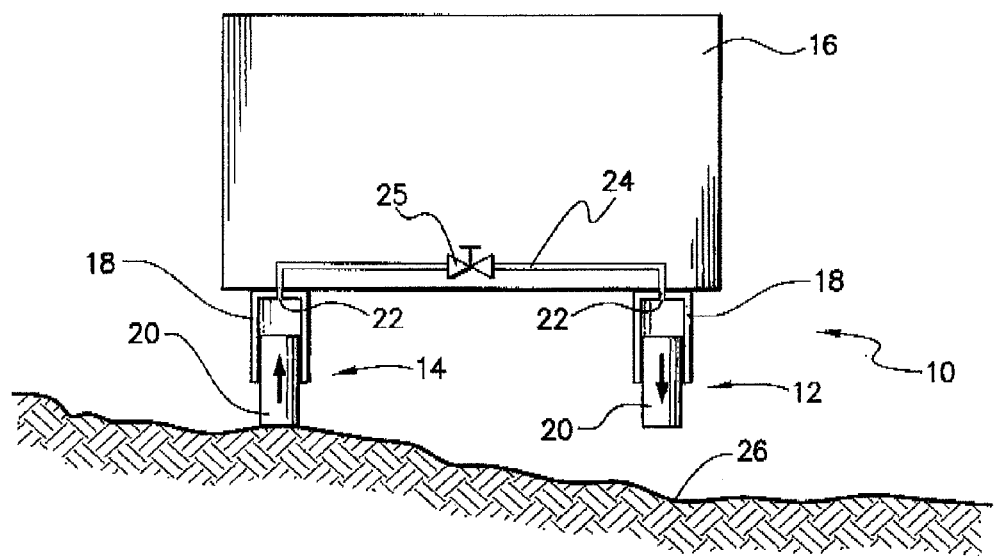
FIGS. 1A and 1B show schematic representations of a support for a structure according to an embodiment of the present invention.
Figure 1B:
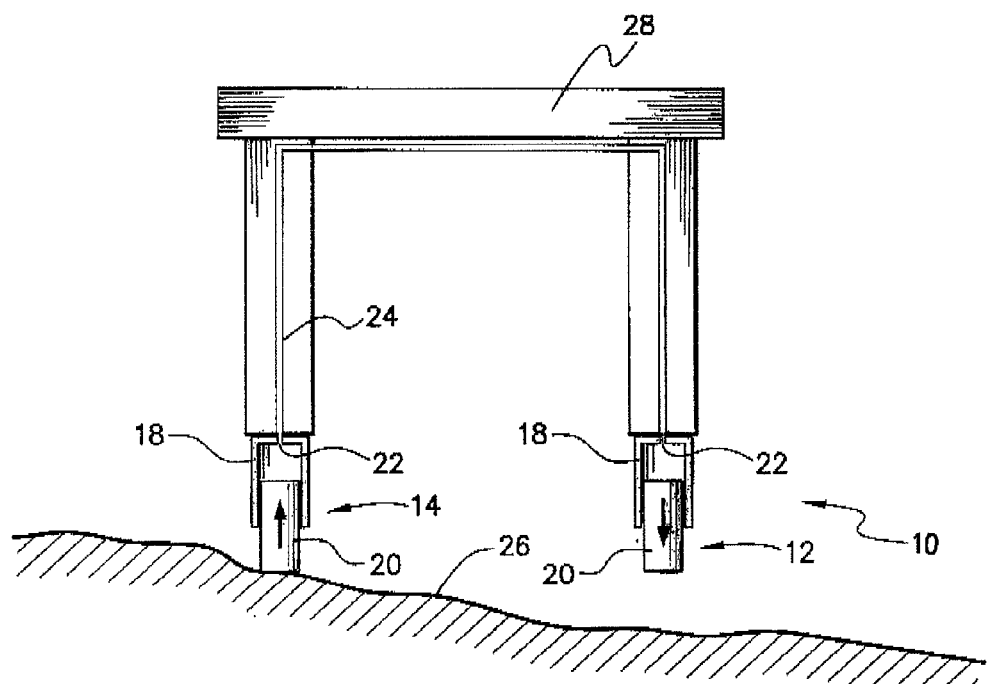

Referring initially to FIGS. 1A and 1B, a support for a structure according to an embodiment of the present invention is now described. FIG. 1A shows the support 10 supporting a structure 16. The support comprises in this embodiment 3 or 4 support elements though FIG. 1A only shows two of the support elements. Each support element 12 and 14 comprises a cylinder 18 and a piston 20. The cylinders 18 each have a fluid inlet/outlet 22 which is connected to the fluid inlet/outlet 22 of the other support element by tube 24. The cylinder 18 is filled with fluid. The amount of fluid that flows through the inlet/outlet 22 determines the movement of the pistons 20 in the cylinders 18. As each fluid inlet/outlet 22 is interconnected to another fluid inlet/outlet 22, an upward movement of one of the pistons in the respective cylinder moves the fluid through the tube 24 and hence effects a downward movement of the other cylinder 20.

When the support is placed on surface 26, the weight of the structure effects an upward movement of piston 20 in support element 14 and a downward movement of piston 20 in support element 12. The movements of the pistons therefore adjust the height of support elements 12 and 14. Once both pistons have reached the adjustment positions, the loading associated with the structure 16 effects a pressure increase within the cylinders and a brake (not shown) secures the pistons in the cylinders in the stationary position. As the adjustment and the securing of the pistons in the cylinders happens automatically, the support is self-adjusting.

In this embodiment, the support 10 also includes a valve 25 arranged to receive a hydraulic liquid. When the valve 25 is open fluid can move between the support 12 and the support 14.

The valve 25 is adapted to restrict fluid transfer such that when the fluid on both sides of the valve 25 is pressurised above a threshold value fluid flow through the valve 25 is limited or prevented. In contrast when the fluid pressure on one side of the valve 25 is below the threshold value, the valve 25 is adapted to allow fluid transfer. When fluid transfer occurs, the pressure on both sides of the valve 25 falls to below the preset limit and the interconnected valves 25 of each support element 12, 14 will open to allow fluid transfer.

This allows the support element 30 to self-adjust upon a change in loading. That is when any one leg is unloaded leg height adjustment is allowed by the opening of the valves 25 and flow of fluid through the tube 24.

FIG. 1B shows a variation of the embodiment shown in FIG. 1A. In this case the structure that is supported by the support 26 is a table 28.

Figure 2:
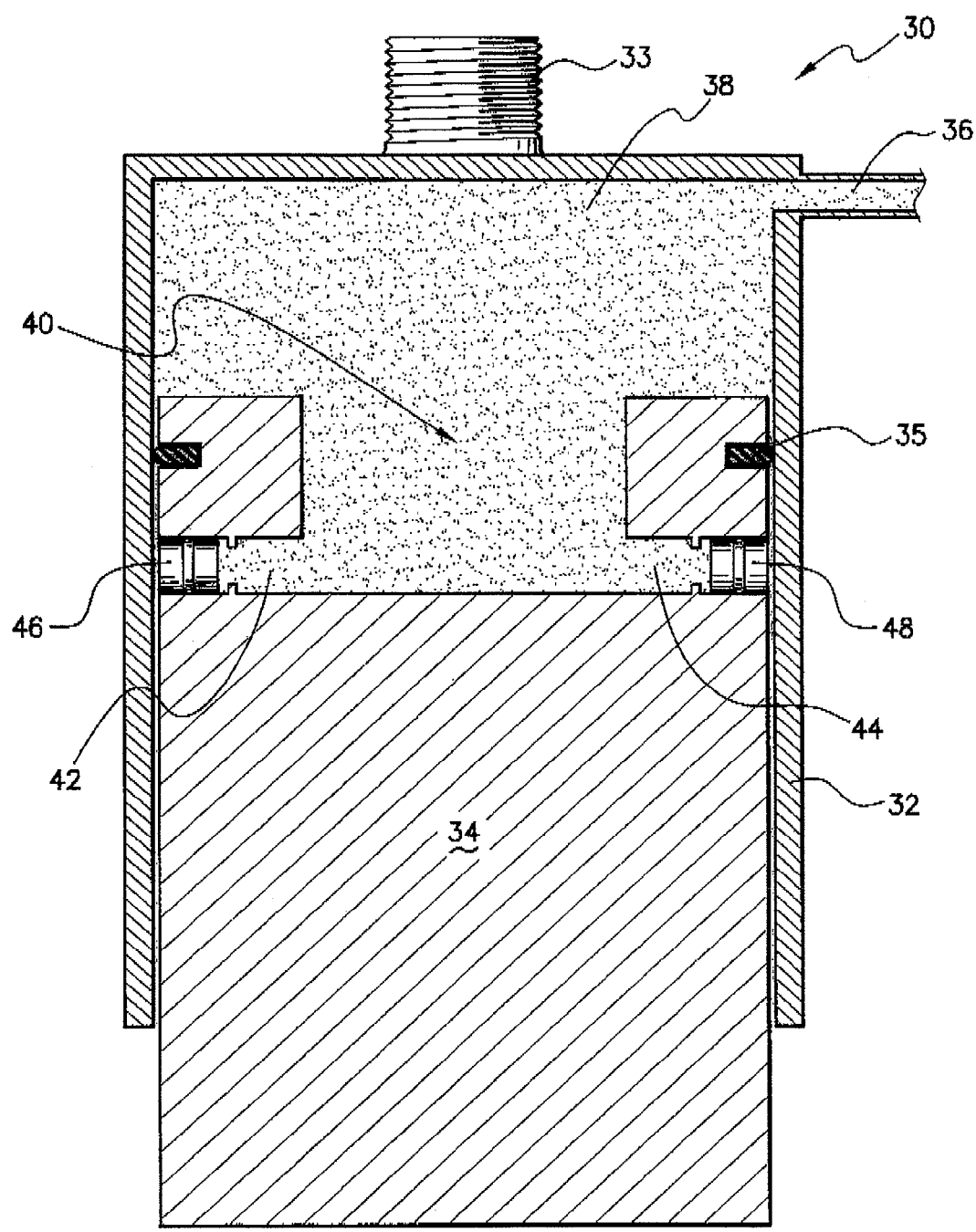
FIG. 2 shows a schematic representation of a support element for supporting a structure according to an embodiment of the present invention.

FIG. 2 shows detail of a support element 30 for supporting a structure, such as support elements 12 or 14 shown in FIGS. 1A and 1B. The support element 30 comprises a cylinder 32 in which a piston 34 is guided. The cylinder 32 has a fluid inlet/outlet opening 36 for receiving and ejecting fluid 38, such as a hydraulic liquid or water. The piston 34 has a seal 35 for sealing the fluid 38 in the cylinder 32. The fluid inlet/outlet 36 is connected to another such fluid inlet/outlet of another support element (not shown).

In the embodiment shown in FIG. 2, the piston 34 includes a cavity 40 having openings 42 and 44 at the side portions of the piston 34. In the openings 42 and 44 brake cylinders 46 and 48 are guided and if the fluid pressure in the cylinder 32 is above a threshold level, the brake cylinders 46 and 48 are pushed against the interior wall of the cylinder 32 so as to position the piston 34 in a stationary position relative the cylinder 32. The cylinder 32 also has a thread 33 for mounting on a structure. This mechanism operates as a valve in the support element 30.

Typically, a structure such as a table is supported by 3 or 4 of the support elements 30 which are interconnected. After placing the table on a surface, the support elements typically adjust for an uneven surface and fluid flows between the cylinders until the pistons are in the adjustment position. The weight of the structure will increase the pressure above the threshold pressure and the brake cylinders 46 and 48 move against the interior wall of the cylinder 32 so as to position the pistons stationary. Consequently, the table will then have a stable position.

Figure 3:
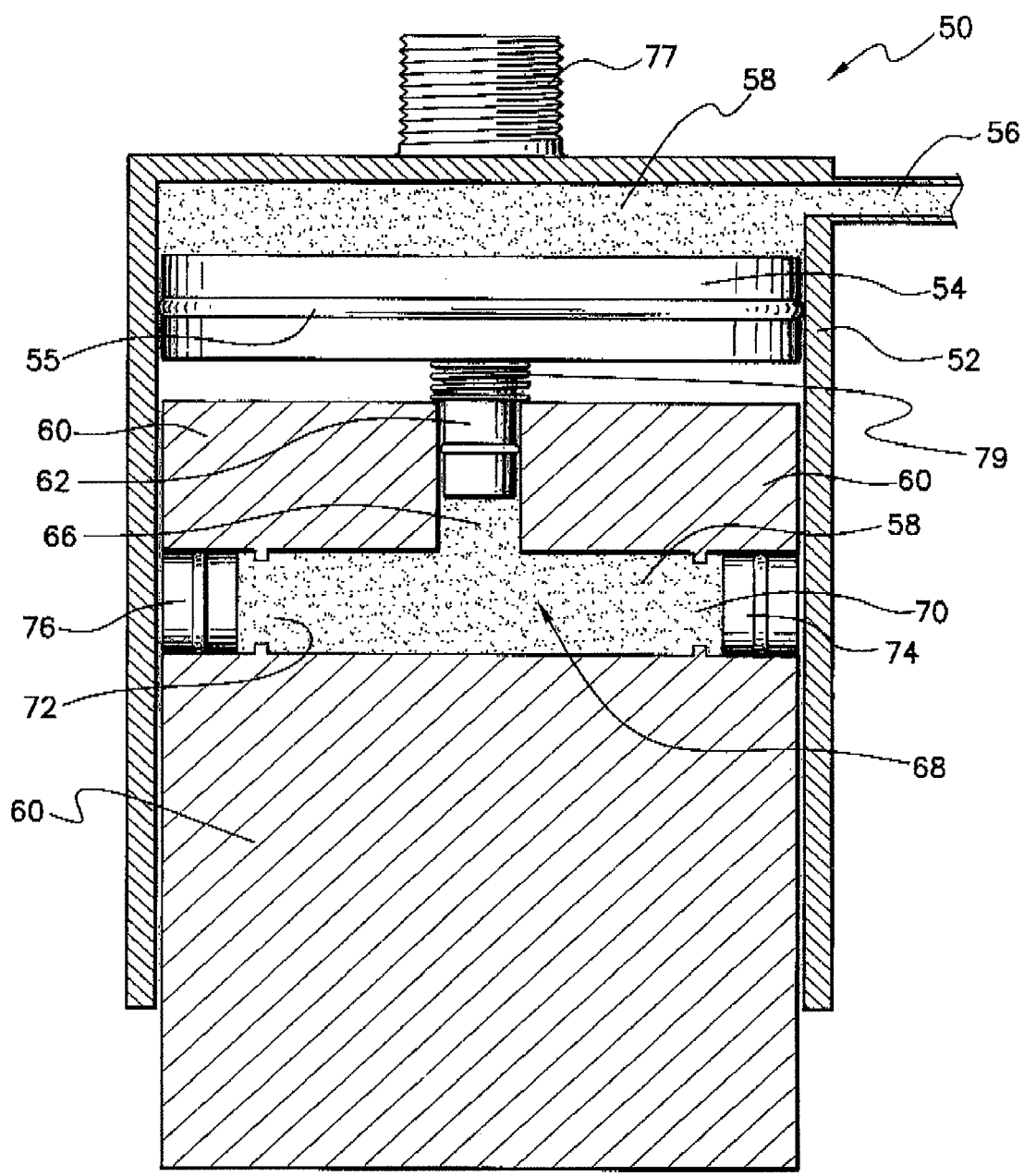
FIG. 3 shows a schematic representation of a support element for supporting a structure according to another embodiment of the present invention.

FIG. 3 shows a support element 50 for supporting a structure according to another embodiment of the invention. Again, the support element 50 may function as support element 12 or 14 in the embodiment shown in FIGS. 1A and 1B and described above. The support element 50 comprises a cylinder 52 in which a piston 54 is guided. The cylinder 52 has a fluid inlet/outlet opening 56 for receiving and ejecting fluid 58, such as a hydraulic liquid or water. The piston 54 has a seal 55 for sealing the fluid in the cylinder 52. The fluid inlet/outlet 56 is connected to another such fluid inlet/outlet of another support element (not shown). In this embodiment the support element 50 comprises another piston 60 positioned below the piston 54. The piston 54 has a cylindrical projection 62 which is received by a corresponding cylindrical bore 66 of the piston 60. The piston 60 has a cavity 68 which is filled with a hydraulic fluid 58 and which has openings 70 and 72. Brake cylinders 74 and 76 are guided in the openings 70 and 72 and, if the fluid pressure in the cavity 68 is above a threshold level, the brake cylinders 74 and 76 are pushed against the interior wall of the cylinder 52 so as to position the piston 60, and thereby the piston 54, in a stationary position relative the cylinder 52. The fluid pressure in the cavity 68 increases in response to the loading associated with the structure. That is, if the moveability of a surface contact portion 102 of the support element 50 is reduced below a threshold value by the loading associated with the structure.

The cylinder 32 also has a thread 77 for mounting on a structure.

Further, the support element 50 comprises a compression spring 79 positioned around the projection 62. When the structure is lifted and therefore the loading on the support element 50 is reduced, the spring 79 functions to push the pistons 54 and 60 apart from one another and thereby reduces the pressure of the fluid in the cavity 68. As a consequence, a back-movement of the brake cylinders 74 and 76 is supported.

Figure 4:
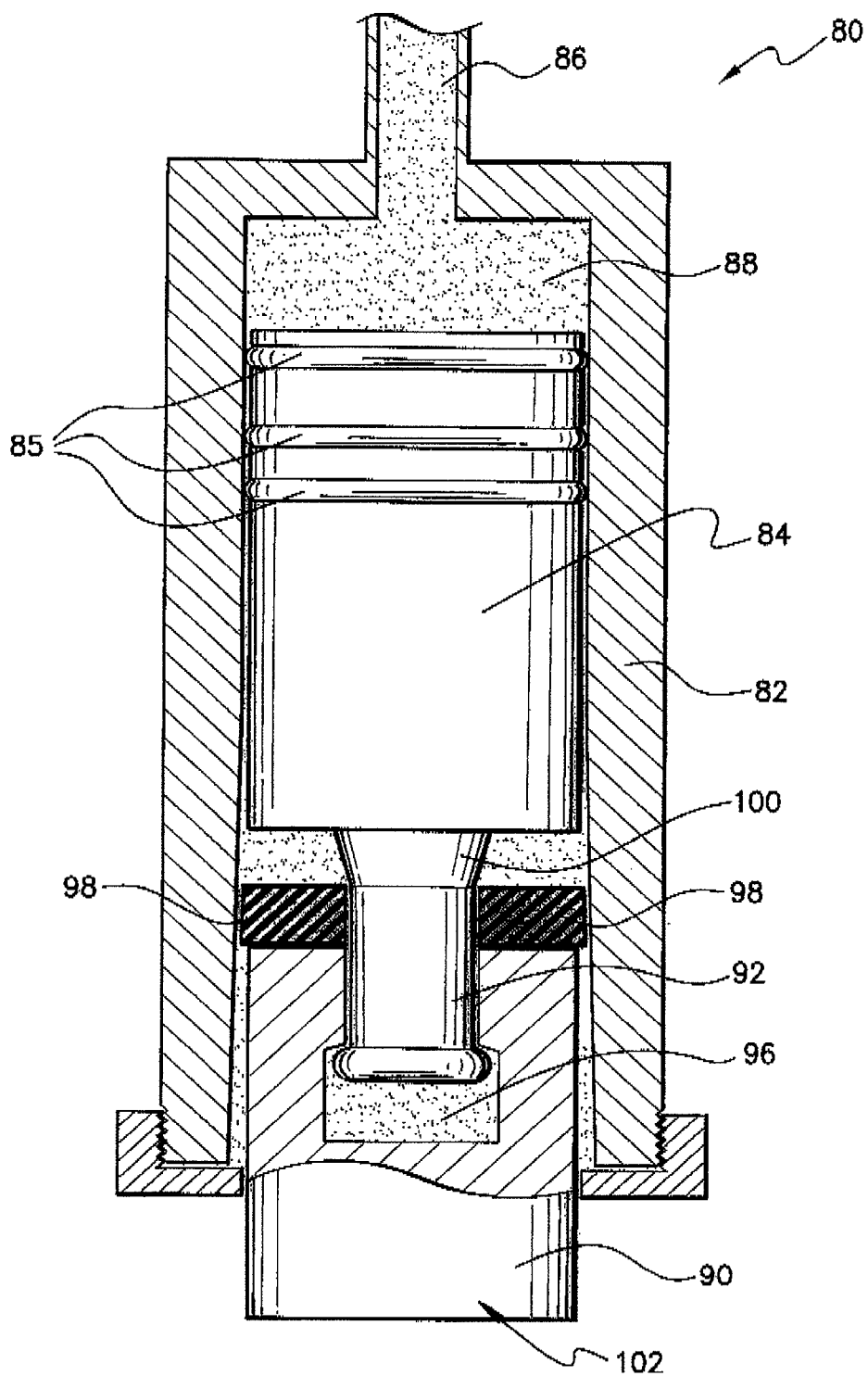
FIG. 4 shows a schematic representation of a support element for supporting a structure according to a further embodiment of the present invention.

FIG. 4 shows a support element 80 for supporting a structure according to a further embodiment of the invention. Again, the support element 80 may function as support element 12 or 14 in the embodiment shown in FIGS. 1A and 1B and described above. The support element 80 comprises a cylinder 82 in which a piston 84 is guided. The cylinder 82 has a fluid inlet/outlet opening 86 for receiving and ejecting fluid 88, such as a hydraulic liquid or water. The piston 84 has seals 85 for sealing the fluid in the cylinder 82. The fluid inlet/outlet 86 is connected to another such fluid inlet/outlet of another support element (not shown). In this embodiment the support element 80 comprises another piston 90 positioned below the piston 84. The piston 84 has a cylindrical projection 92 which is positioned in a recess 96 of the piston 90.

The piston 90 has a ring-portion 98 which is composed of an elastic material such as a rubber-like material and the projection 92 of the piston 84 has a wedge portion 100. In this embodiment the piston 90 has a surface contact portion 102 and when the support element 80 is in an adjusted position after movement of the piston 84 relative to the cylinder 82, the surface contact portion contacts the surface and the movement of the piston 90 is restricted. The weight of the structure effects a further movement of the piston 84 in a downward direction against the piston 90 and the wedge portion 100 wedges the elastic ring-like portion 98 outwardly against the interior wall of the cylinder 82 and thereby inhibits further movement of the pistons 90 and 84 in the cylinder 82.

Figure 5:
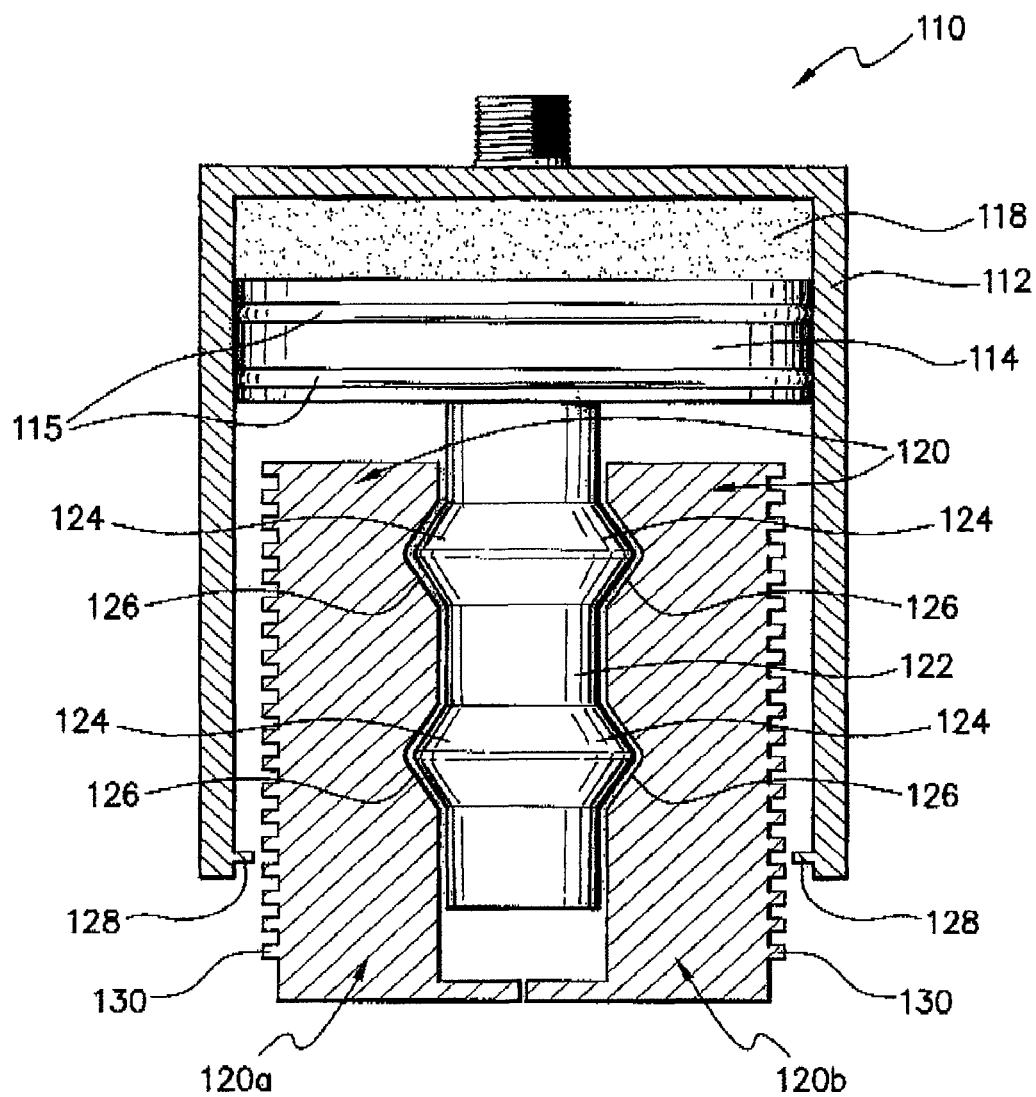
FIG. 5 shows a schematic representation of a support element for supporting a structure according to yet another embodiment of the present invention.

FIG. 5 shows a support element 110 for supporting a structure according to a yet another embodiment of the invention. Again, the support element 110 may function as support element 12 or 14 in the embodiment shown in FIGS. 1A and 1B and described above. The support element 110 comprises a cylinder 112 in which a piston 114 is guided. The cylinder 112 has a fluid inlet/outlet opening (not shown) for receiving and ejecting fluid 118, such as a hydraulic liquid or water. The piston 114 has a seal 115 for sealing the fluid in the cylinder 112. The fluid inlet/outlet is connected to another such fluid inlet/outlet of another support element (not shown). In this embodiment the support element 110 comprises a surface contact portion 120 which is positioned below the piston 114 and around projection 122 of the piston 114.

The projection 122 has wedge-shaped side projections 124 and the surface contact portion 120 has wedge-shaped recesses 126. In this embodiment, the surface contact portion comprises two parts 120a and 120b. When the support element 110 is in an adjusted portion after movement of the piston 114 relative to the cylinder 112, the surface contact portion 120 contacts the surface and the movement of the surface contact portion therefore is restricted. The weight of the structure effects a further movement of the piston 114 in a downward direction against the surface contact portion 120 and the wedge portions 122 move parts 120a and 120b apart from one another and towards the interior wall of the cylinder 112. In this embodiment, the lower part of the interior wall of the cylinder 112 has at least one tooth 128 on the surface and the parts 120a and 120b have toothed surfaces 130. When the parts 120a and 120b are moved towards the interior side wall of the cylinder 112, the teeth 128 engage with the toothed surface 130 and the engagement inhibits further movement of the piston 118 and the surface contact portion 120.

Figure 6:
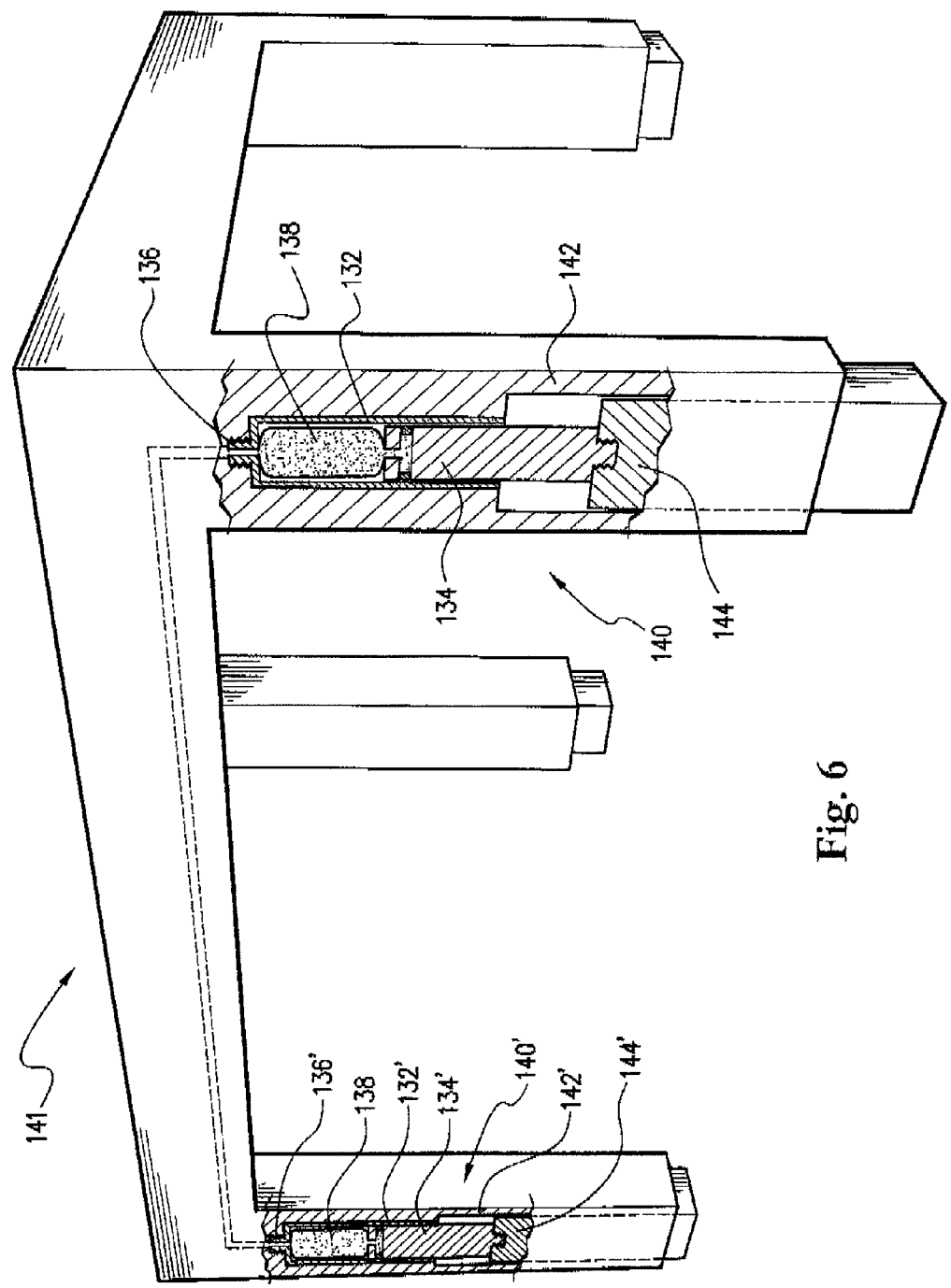
FIG. 6 shows a perspective view of a representation of a support for a structure according to an embodiment of the present invention.
Figure 7:
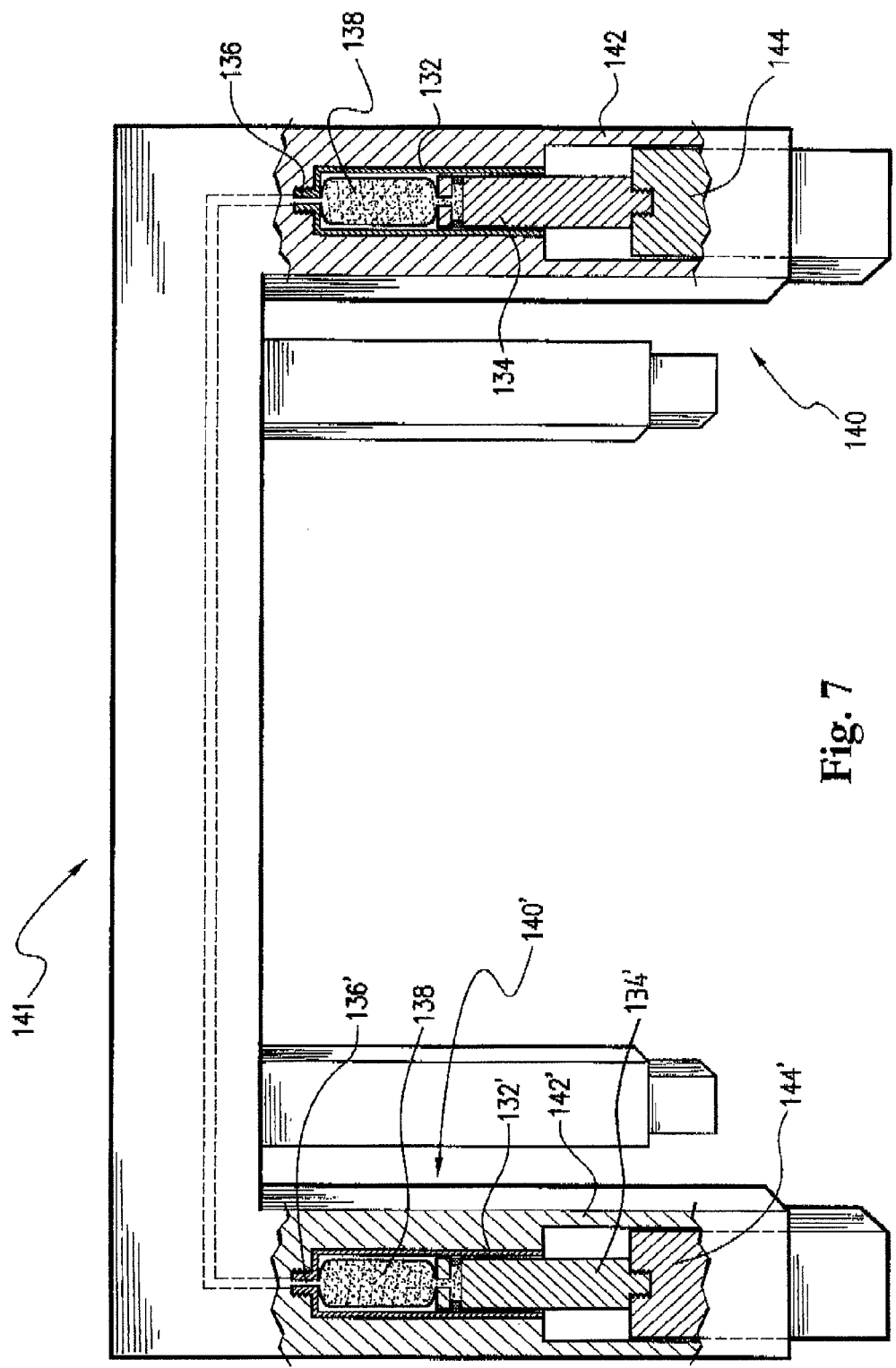
FIG. 7 shows a front perspective view of a representation of the support for a structure of FIG. 6, FIGS. 8 and 9 show a schematic representation of a support for a structure according to an embodiment of the present invention.

FIGS. 6-7 show two support elements 140 and 1401 in use in a table 141. The support elements 140 and 140' comprise a cylinder 132 and 132' in which a piston 134 and 134' is guided. The cylinders 132 and 132' have a fluid inlet/outlet opening 136 and 136'. The fluid inlet/outlet openings 136 and 136' are in fluid communication with one another. In this embodiment the support elements 140 and 140' comprise a piston extension 144 and 144' which is positioned below the pistons 134 and 134' and attached thereto. The piston extensions 144 and 144' are guided in telescopic cylinders 142 and 142'.

In use the table 141 is placed on an uneven surface and the support elements 140 and 140' typically adjust for the uneven surface. The fluid 138 will flow between the cylinders 132 and 132' until the loading associated with the structure acts to increase the fluid pressure within the cylinders 132 and 132' above a threshold pressure and the braking means 135 act to retain the piston 134 and 134' in a stationary position relative to the cylinder 132 and 132'. Consequently, the table 141 will then have a stable position.

Figure 8:
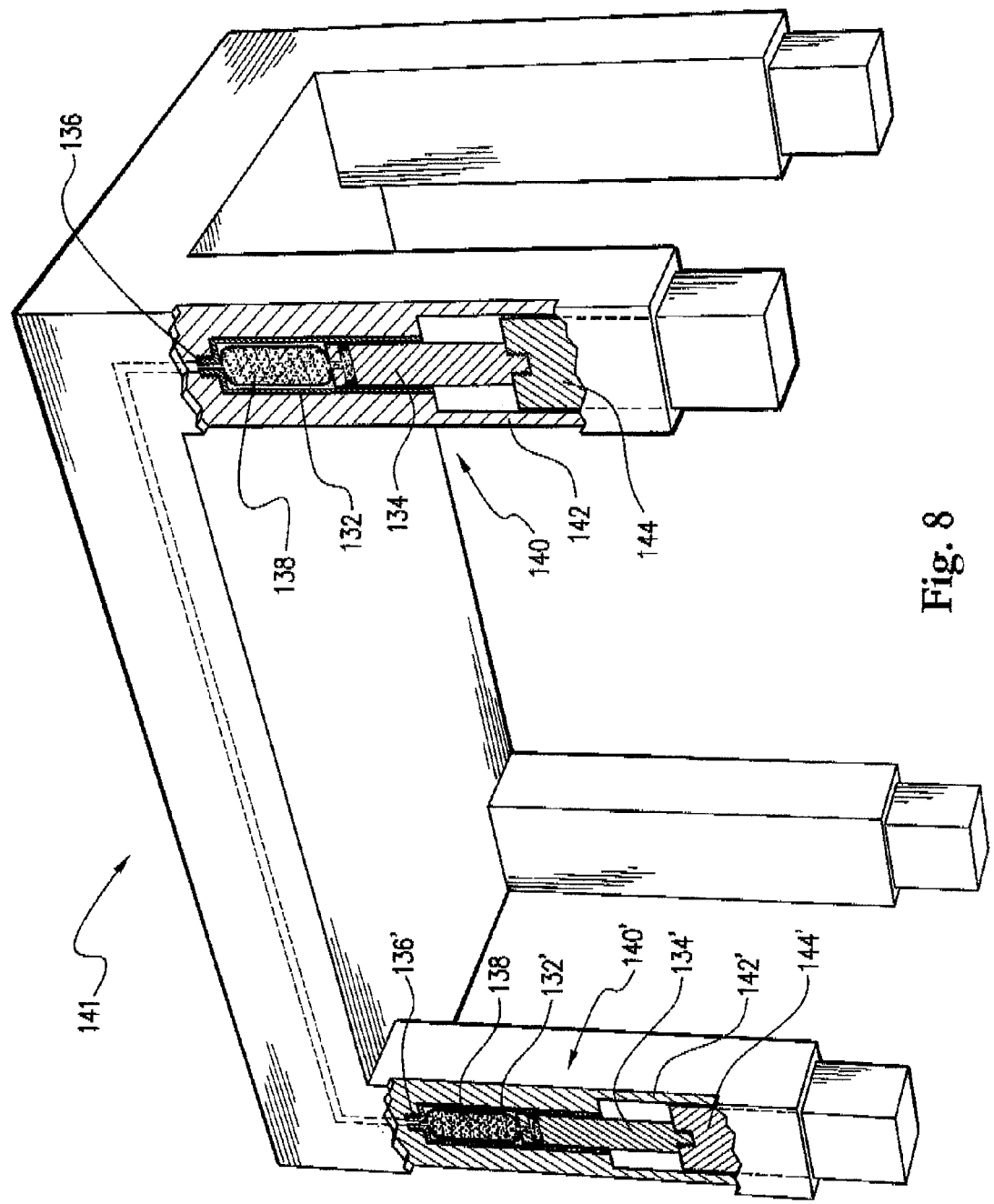
Figure 10B:
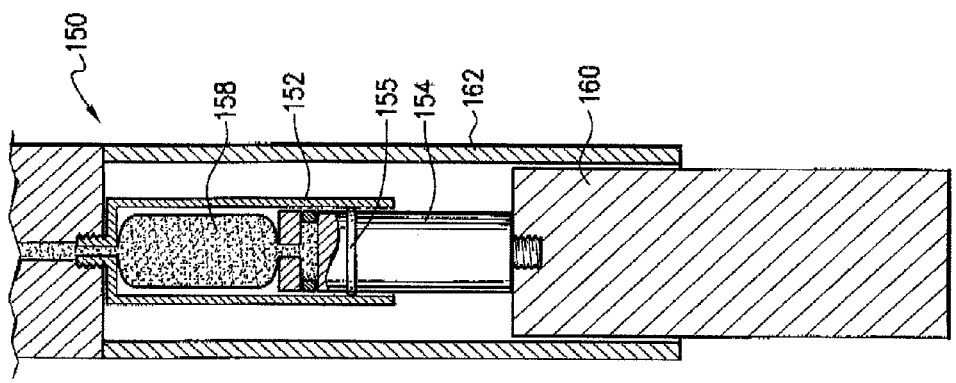
FIG. 10 shows a schematic representation of the support for a structure of FIGS. 10A and 10B in use.
Figure 10A:
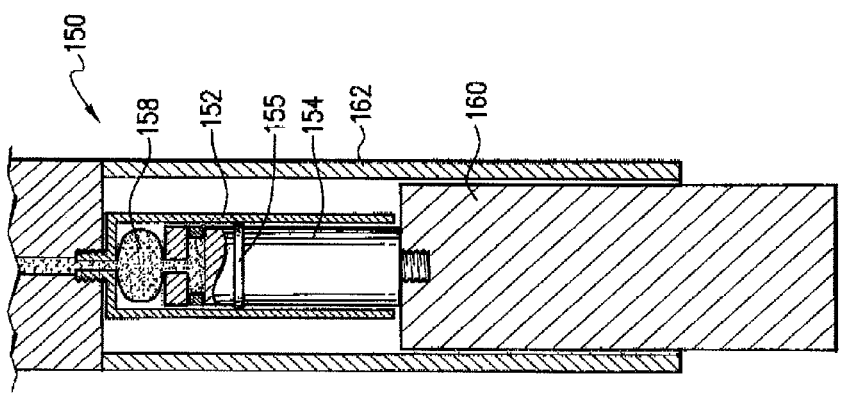
Figure 9:
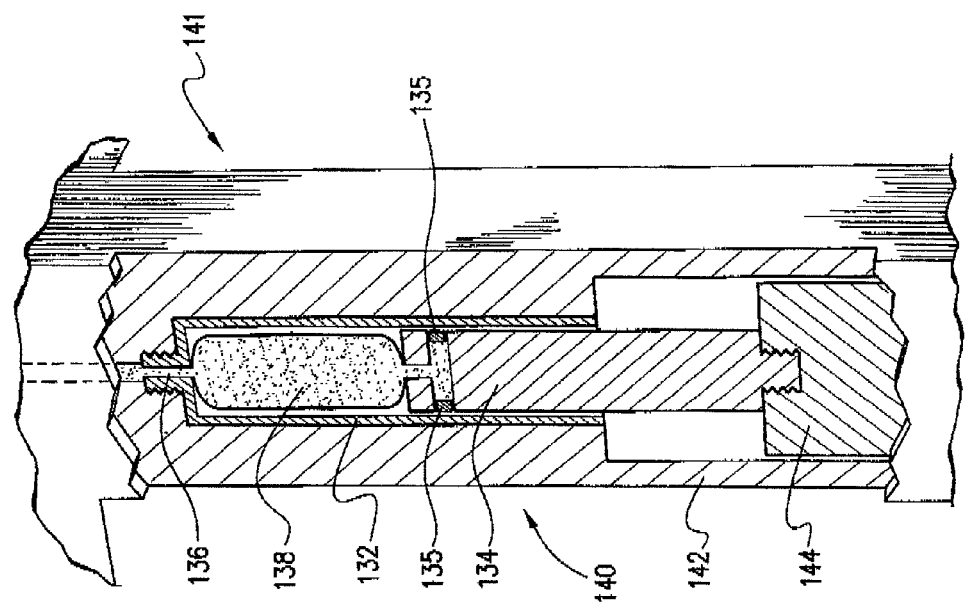

FIGS. 8, 9 and 10 show a support element 150 for supporting a structure according to a yet another embodiment of the invention. Again, the support element 150 may function as support element 12 or 14 in the embodiment shown in FIGS.

1A and 1B and described above. The support element 150 comprises a cylinder 152 in which a piston 154 is guided. The piston 154 includes a seal 155 which stops the fluid 158 from escaping the cylinder 152. The cylinder 152 has a fluid inlet/outlet opening 156. The fluid inlet/outlet opening 156 is in fluid communication with another such fluid inlet/outlet opening 156'. In this embodiment the support element 150 comprises a piston extension 160 which is positioned below the piston 154 and attached thereto. The piston extension 160 is guided in telescopic cylinder 162. This piston extension 160 and telescopic cylinder 162 combination protects the piston 154 and cylinder 152 assembly of support element 150. It can be seen that in use the transverse load on the piston 154 and cylinder 152 assembly is limited by the protective piston extension 160 and telescopic cylinder 162 combination.

In use the piston extension 160 and telescopic cylinder 162 allow the support element 150 to be composed of lighter-weight materials with less strength than would be required without the piston extension 160 and telescopic cylinder 162.

Figure 11:
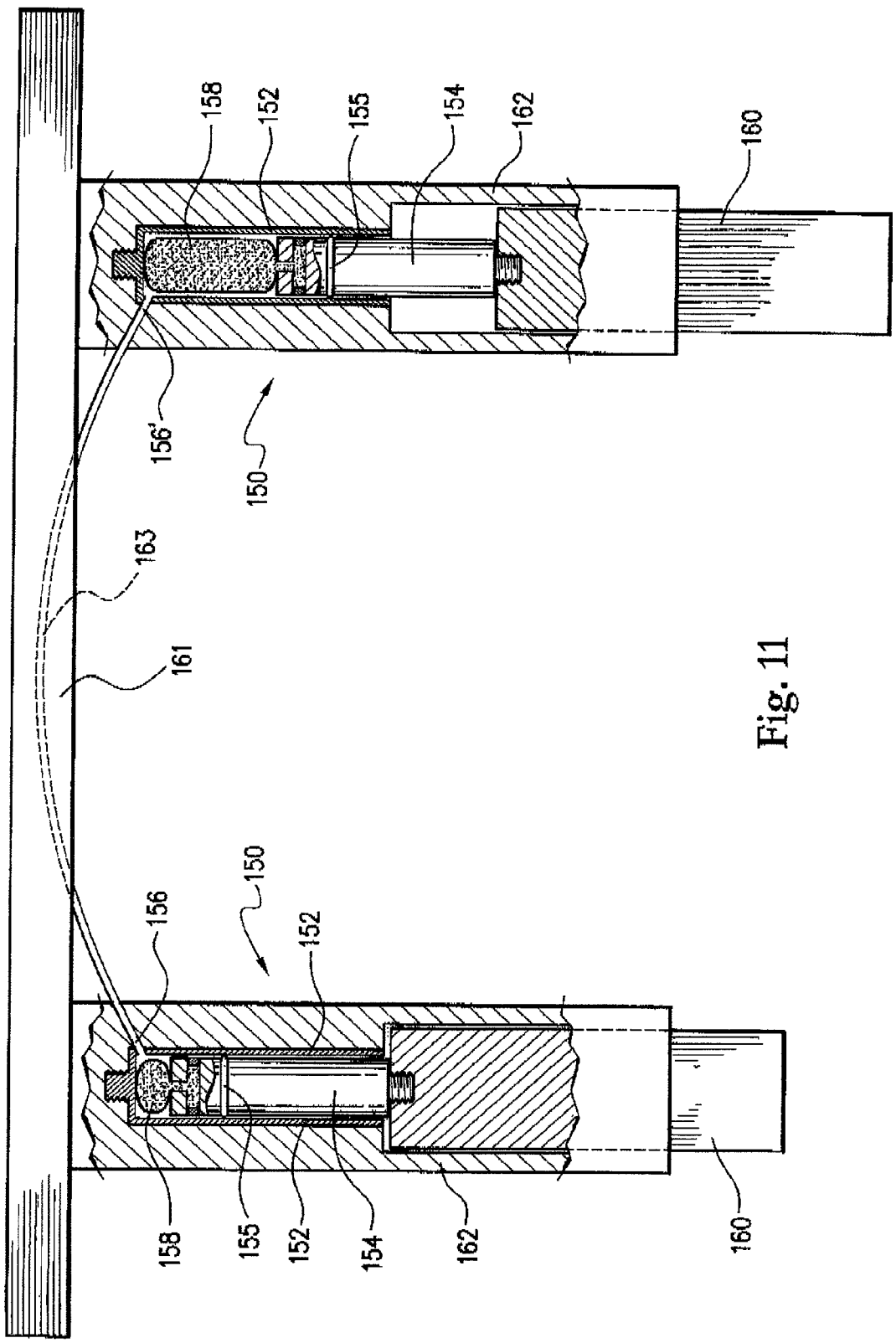
FIG. 11 shows a schematic representation of a support element for supporting a structure according to an embodiment of the present invention.

FIG. 11 shows two support elements 150 and 150 incorporated into a table 161. The support elements 150 and 150 are in fluid communication by means of fluid channel 163.

FIGS. 11-14 show a support element 170 for supporting a structure in more detail. The support element 170 comprises a cylinder 172 in which a piston 174 is guided. The cylinder 172 has a fluid inlet/outlet opening 176 for receiving and ejecting fluid 178, such as a hydraulic liquid or water. The fluid 178 is contained in a bladder 179. The fluid inlet/outlet 176 is connected to another such fluid inlet/outlet of another support element (not shown). In this embodiment the piston 174 has a cavity 180 having openings 182 and 184 at the side portions of the piston 184. Cavity 180 contains fluid 181, such as hydraulic fluid or water. In the openings 182 and 184 brake cylinders 186 and 188 are guided and if the fluid pressure in the cylinder 172 is above a threshold level, the brake cylinders 186 and 188 are pushed against the interior wall of the cylinder 172 so as to position the piston 174 in a stationary position relative the cylinder 172. The cavity 180 further includes seals 197 for retaining fluid 181 within the cavity 180. The cylinder 172 also has a thread 173 for mounting on a structure. In the embodiment shown in FIG. 14 the cavity fluid 181 is maintained in a bladder 183.

Further, in the embodiment shown in FIGS. 11-14 a piston plate 194 is positioned between the fluid 178 in the cylinder 172 and the piston 174. The piston plate 194 includes a piston plate guide 195 which extends into the cavity 180. Seals 197 are positioned to retain fluid 181 in cavity 180

If the fluid pressure in the cylinder 172 is above a threshold level the pressure is transferred through the fluid 181 in the cavity 180 into the brake cylinders 186 and 188 such that the brake cylinders 186 and 188 are forced against the interior wall of the cylinder 172. At a threshold level the piston 174 is held in a fixed position in relation to the cylinder 172.

The distance between the brake cylinders 186 and 188 and the fluid 178 in the cylinder 172 is minimised in order to reduce the overall length of the support element 170.

Figure 15:
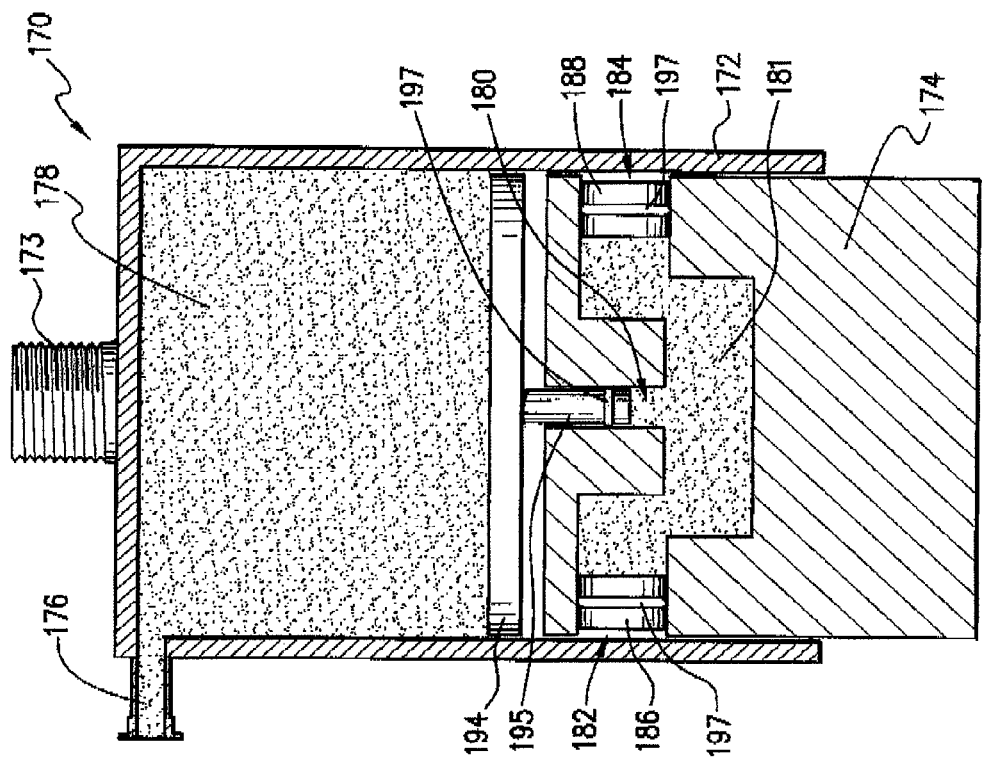
FIG. 15 shows a schematic representation of a support element for supporting a structure according to an embodiment of the present invention.
Figure 14:
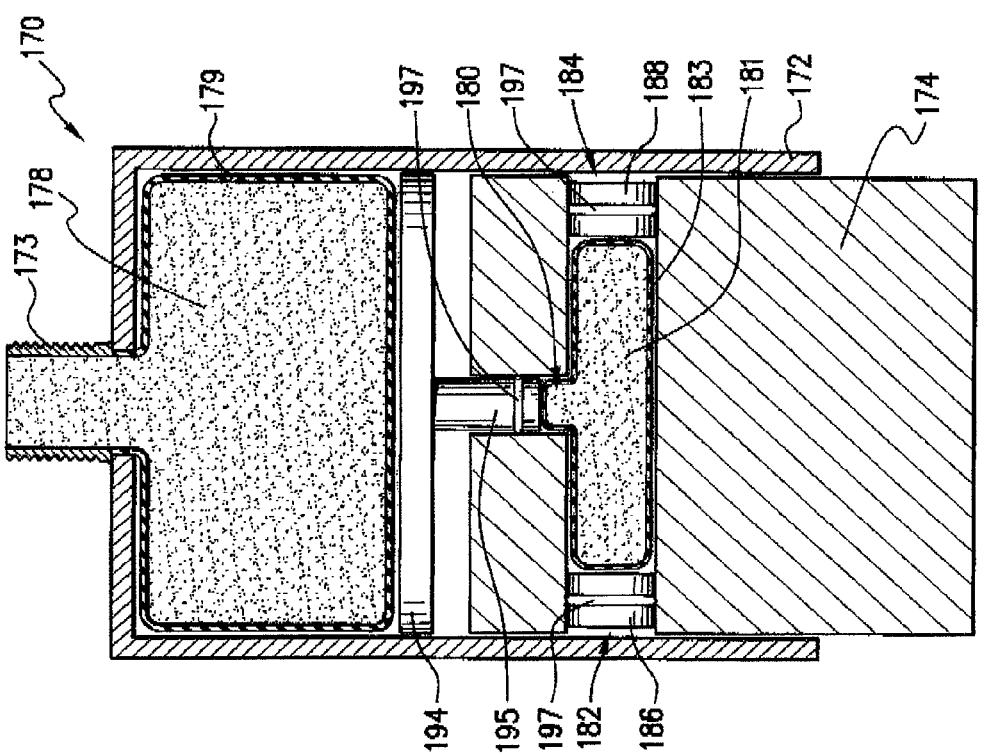
FIG. 14 shows a schematic representation of the support element for supporting a structure of FIG. 12.

FIG. 15 illustrates a further embodiment of a support element 170 for supporting a structure. More specifically, the embodiment in FIG. 15 includes similar features as the embodiment found in FIG. 14 but includes some differences. For example, the embodiment in FIG. 15 includes a differently shaped cavity 180 when compared to the embodiment in FIG. 14. Other features in this embodiment similar to those in other embodiments include like reference numbers. However, differences will be readily apparent from the figures.

Figure 16:
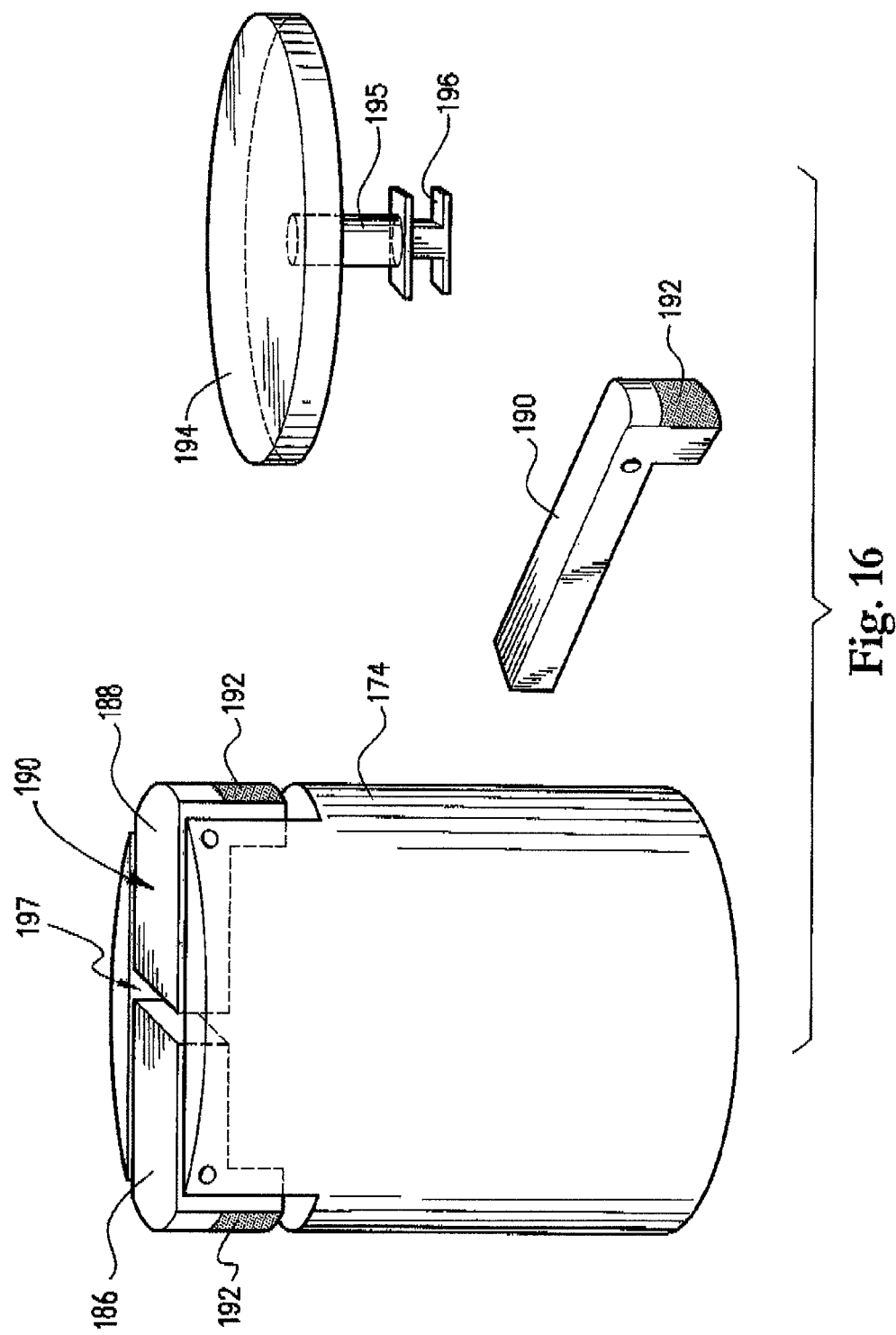
FIG. 16 shows a schematic representation of a support element for supporting a structure according to an embodiment of the present invention.

FIG. 16 illustrates a further embodiment of a piston 174. In this view, similar to the embodiment found in FIGS. 11-14, the embodiment includes a piston plate 194 and a piston 174. Further, the piston plate 194 includes a piston plate guide 195. Other features in this embodiment similar to those in other embodiments include like reference numbers. However, differences will be readily apparent from the figures.

FIG. 17 shows detail of a support element 200 for supporting a structure in a further embodiment of the invention. The support element 200 comprises a cylinder 202 in which a piston 204 is guided. The cylinder 202 has a fluid inlet/outlet opening 206 for receiving and ejecting fluid 208, such as a hydraulic liquid or water. The fluid inlet/outlet 206 is connected to another such fluid inlet/outlet of another support element (not shown). The fluid inlet/outlet opening 206 includes a fluid inlet/outlet extension 207 which extends through a fluid chamber 209 of the cylinder 202

In this embodiment the support element 200 has a cavity 210 positioned between a piston plate 214 and piston 204. The cavity 210 has an opening 211 extending into the piston 204. Piston plate 214 abuts fluid chamber 209 and comprises a piston plate guide 216 which extends into opening 211 in piston 204. Piston plate 214 further comprises crimpers 218.

The fluid inlet/outlet extension 207 extends into the cavity 210 and to the fluid inlet outlet 206 such that the fluid enters the fluid chamber 209 after proceeding through the cavity 210 within the fluid inlet/outlet extension 207. Fluid inlet/outlet extension 207 includes a flexible portion 213 which extends through the cavity 210.

The cavity 10 further includes a resistance means 212. Resistance means 212 retains the piston plate 214 in a position distal from the piston 204. An increase in fluid pressure within the fluid chamber 209 acts against resistance means 212 to move the piston plate 214 proximal to the piston 204. It can be seen that this movement brings the crimpers 218 into contact with the flexible portion 208. In use, this disrupts the flow of fluid through fluid inlet/outlet extension 207 and inlet/outlet 206 into fluid chamber 209.

If the fluid pressure in the cylinder 202 and fluid chamber 209 is above a threshold level this disruption of flow results in the braking of the piston 204 such that the piston 204 is held in a fixed position in relation to the cylinder 202.

Figure 19:
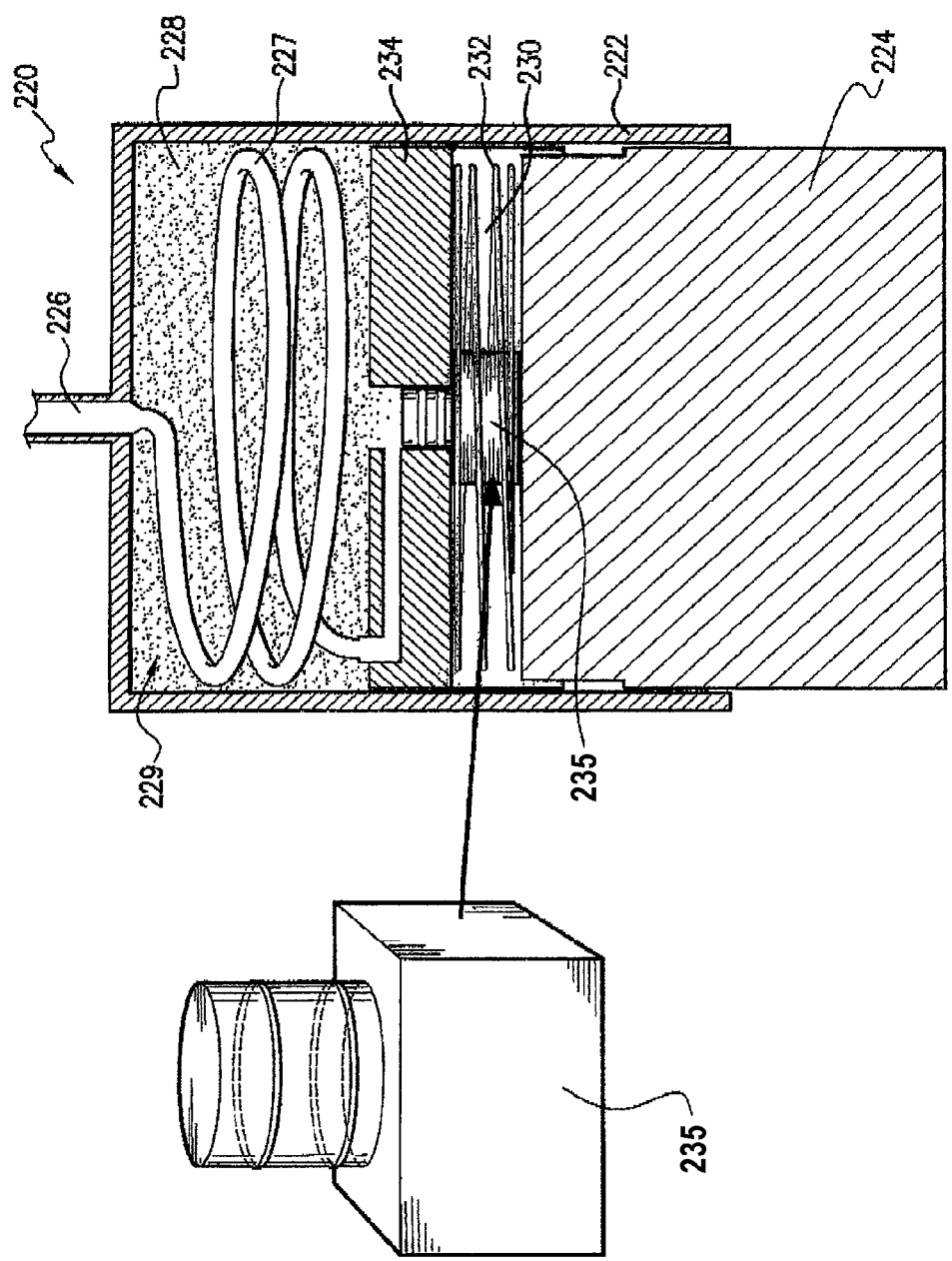
FIG. 19 shows a schematic representation of a support element for supporting a structure according to an embodiment of the present invention.
Figure 20:
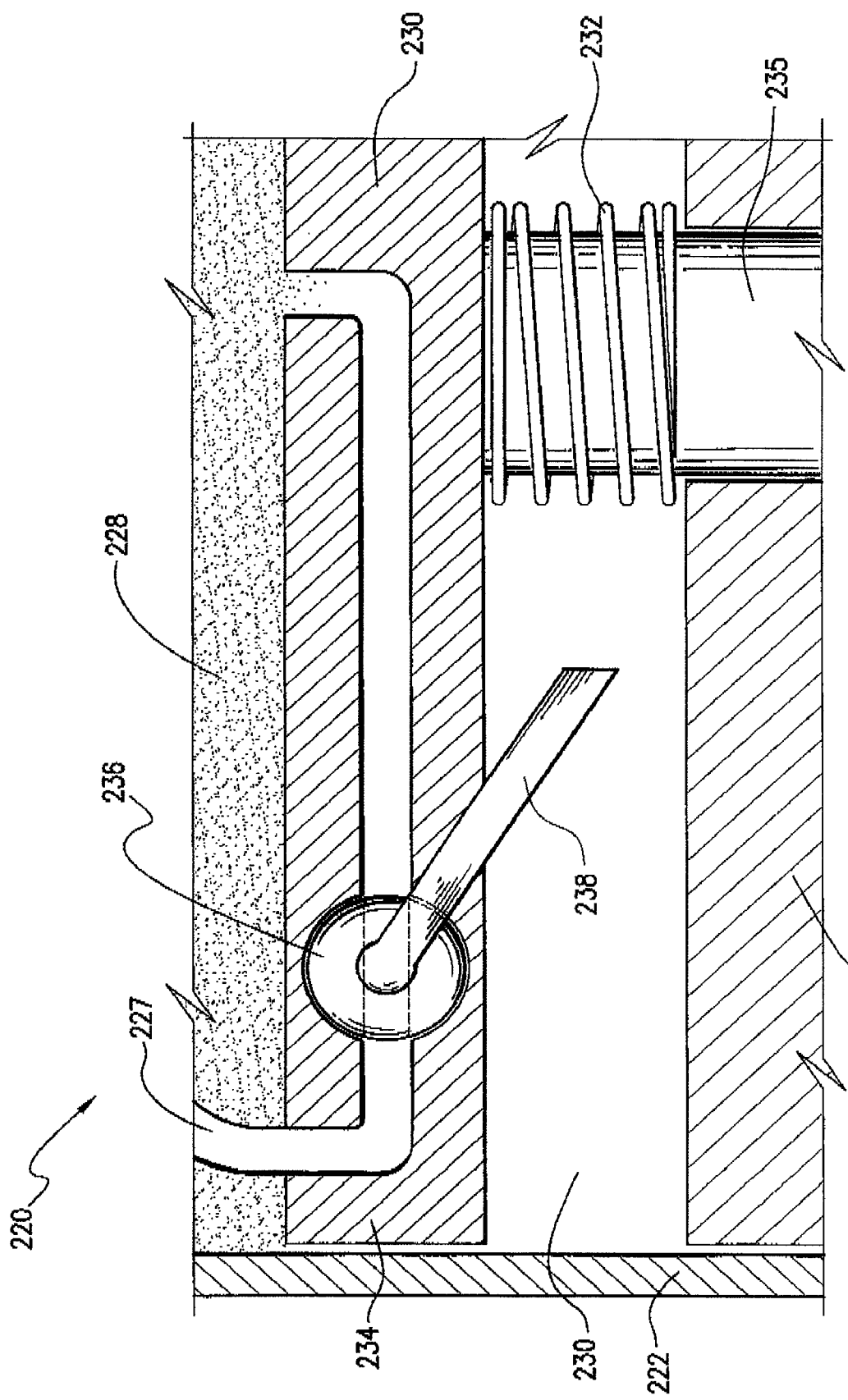
FIG. 20 shows a schematic representation of a support element for supporting a structure according to an embodiment of the present invention.

FIGS. 18-20 show detail of a support element 220 for supporting a structure in a further embodiment of the invention. The support element 220 comprises a cylinder 222 in which a piston 224 is guided. The cylinder 222 has a fluid inlet/outlet opening 226 for receiving and ejecting fluid 228, such as a hydraulic liquid or water. The fluid inlet/outlet 226 is connected to another such fluid inlet/outlet of another support element (not shown). The fluid inlet/outlet opening 226 includes a fluid inlet/outlet extension 227 which extends through a fluid chamber 229 of the cylinder 222.

In this embodiment the support element 220 has a cavity 230 positioned between a piston plate 234 and piston 224. Piston plate 234 abuts fluid chamber 229.

The fluid inlet/outlet extension 227 extends into the cavity 230 and to the fluid inlet/outlet 226 such that the fluid 228 enters the fluid chamber 229 after proceeding through the cavity 220 within the fluid inlet/outlet extension 227.

The fluid inlet/outlet extension 227 includes a braking valve 236 which is moveable between a closed position and an open position. In the open position fluid 228 flows through the fluid inlet/outlet extension 227 and inlet/outlet 226. In the closed position fluid inlet/outlet extension 227 is closed disrupting the flow of fluid within the system.

The cavity 230 further includes a resistance means 232. Resistance means 232 retains the piston plate 234 in a position distal from the piston 224. An increase in fluid pressure within the fluid chamber 229 acts against resistance means 232 to move the piston plate 234 proximal to the piston 224. This movement actuates the valve 236 to bring it into a closed position.

The closed valve 236 results in the braking of the piston 224 such that the piston 224 is held in a fixed position in relation to the cylinder 222.

In the embodiment of FIG. 19 the piston plate 234 includes a piston plate guide 235 which extends into a piston cavity 237 in the piston 224.

The braking valve 236 is a piston valve or ball valve.

FIG. 20 shows a detailed view of a ball valve 236 within support element 220. Ball valve 236 comprises valve arm 238 which extends into cavity 230. When fluid pressure in the cylinder 222 increases piston plate 234 moves proximal to piston 224 actuating valve arm 238 to move. At a threshold pressure ball valve 236 closes inlet/outlet extension 227.

Figure 21:
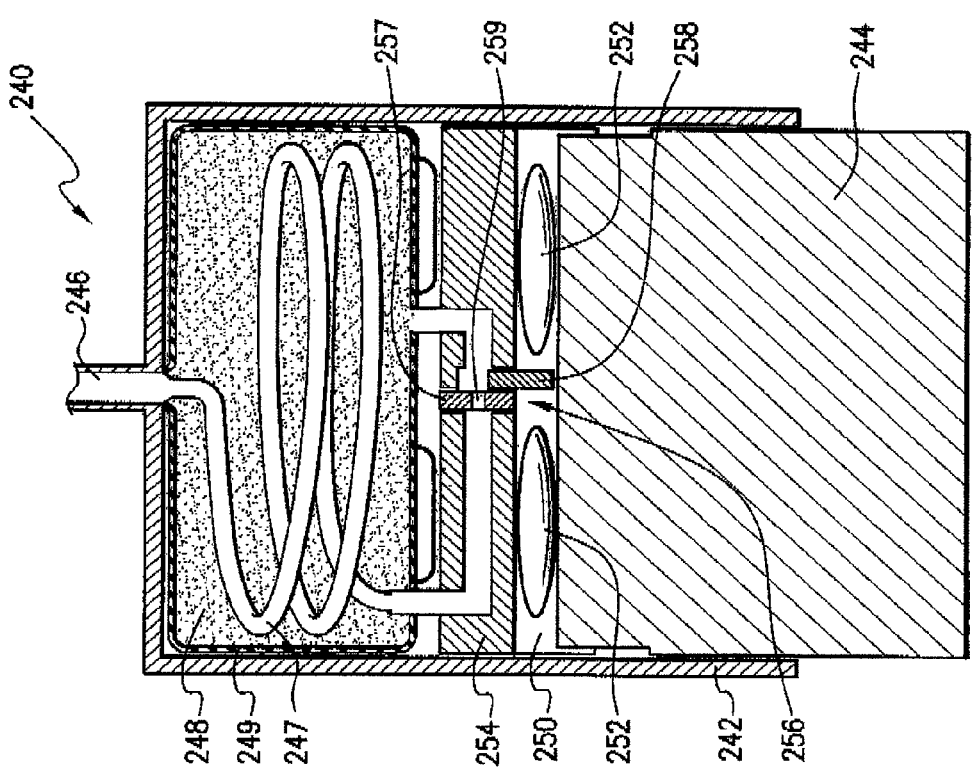
FIG. 21 shows a schematic representation of a valve element according to an embodiment of the present invention.

FIG. 21 shows detail of a support element 240 for supporting a structure in a further embodiment of the invention. The support element 240 comprises a cylinder 242 in which a piston 244 is guided. The cylinder 242 has a fluid inlet/outlet opening 246 for receiving and ejecting fluid 248, such as a hydraulic liquid or water. The fluid 248 is contained in a bladder 249. The fluid inlet/outlet 246 is connected to another such fluid inlet/outlet of another support element (not shown). The fluid inlet/outlet opening 246 includes a fluid inlet/outlet extension 247 which extends through the bladder 249.

In this embodiment the support element 240 has a cavity 250 positioned between a piston plate 254 and piston 244. Piston plate 254 abuts bladder 249.

The fluid inlet/outlet extension 247 extends into the cavity 250 and to the fluid inlet/outlet 246 such that the fluid 248 enters the bladder 249 after proceeding through the cavity 250 within the fluid inlet/outlet extension 247.

The fluid inlet/outlet extension 247 includes a braking member 256 which is moveable between a closed position and an open position. In the open position fluid 248 flows through the fluid inlet/outlet extension 247 and inlet/outlet 246. In the closed position fluid inlet/outlet extension 247 is closed disrupting the flow of fluid 248 within the system. The breaking member 256 comprises a first ceramic disk 257 and a second ceramic disk 258. The first ceramic disk 257 includes an aperture 259 which allows the flow of fluid 248 through inlet/outlet extension 247.

The cavity 250 further includes a resistance bladder 252. Resistance bladder 252 is air or fluid-filled and retains the piston plate 254 in a position distal from the piston 244. An increase in fluid pressure within the fluid chamber 249 acts against resistance means 252 to move the piston plate 254 proximal to the piston 244. This movement moves the second ceramic disk 258 such that it covers the aperture 259 disrupting fluid flow through inlet/outlet extension 247. This results in the braking of the piston 244 such that the piston 244 is held in a fixed position in relation to the cylinder 242.

Figure 22:
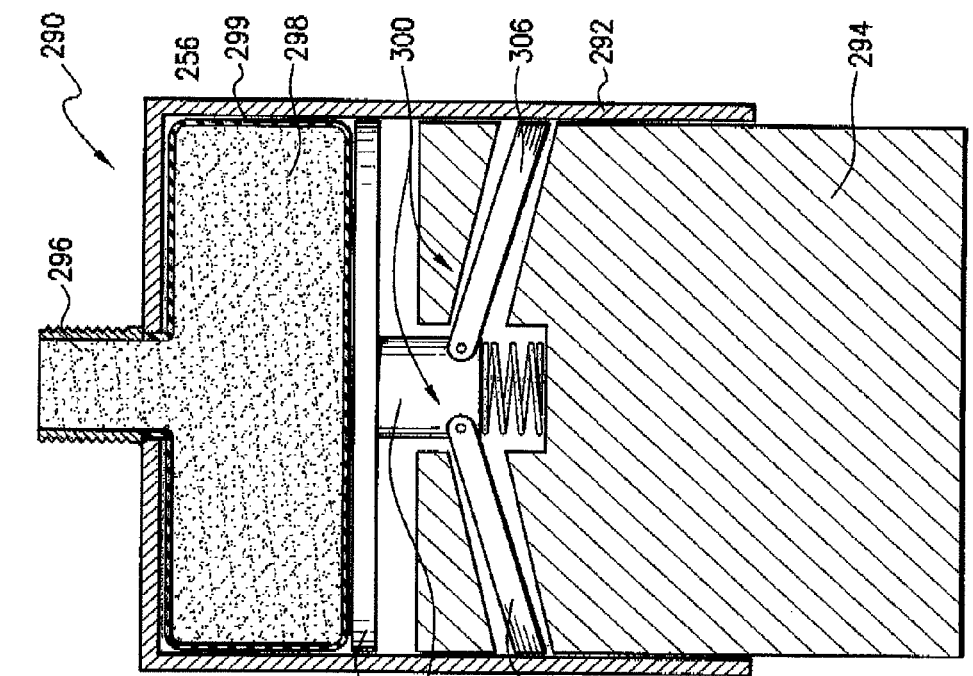
FIG. 22 shows a schematic representation of a valve element according to an embodiment of the present invention.

FIG. 22 shows a lever braking means 300 in a support element. The support element 290 comprises a cylinder 292 in which a piston 294 is guided. The cylinder 292 has a fluid inlet/outlet opening 296 for receiving and ejecting fluid 298, such as a hydraulic liquid or water. The fluid 298 is contained in a bladder 299. The fluid/outlet 296 is connected to another such fluid inlet/outlet of another support element (not shown).

The braking means 300 comprises a braking arm 306 which is attached to piston guide 305 and thereby indirectly to piston plate 304. When the fluid pressure in the cylinder 292 reaches a threshold value the piston plate 304 moves downwardly actuating braking arm 306. Braking arm 306 comes into contact with the internal wall of cylinder 292. Contact between braking arm 306 and the internal surface of cylinder 292 retains piston 294 in a stationary position relative to cylinder 292.

The support can utilised in a variety of fields. For example, the support system can support a building, portable building, scaffolding, tripod, ladder, white goods, tables, chairs, furniture, stands, viewing platforms, machinery, bulldozers and construction equipment.

FIG. 23 shows a valve element 310 of a support element for supporting a structure according to a yet another embodiment of the invention. The valve element 310 is positioned between two support elements (not illustrated). The valve element 310 comprises an upper fluid reservoir 311 and a lower fluid reservoir 312. A ceramic disk 313 is disposed between the upper reservoir 311 and lower reservoir 312. The valve element 310 further comprises two opposing pistons, upper piston 315 and lower piston 316. Upper piston 315 is positioned to be impacted by a change in pressure in upper reservoir 311. Lower piston 316 is positioned to be impacted by a change in pressure in lower reservoir 312. The ceramic disk 313 includes an upper reservoir aperture 320 and a lower reservoir aperture 321. The upper piston 315 includes an upper piston aperture 322 while the lower piston includes a lower piston aperture 323. The pistons 315 and 316 are biased by means of springs 318 and 319 such that when the pressure is below a threshold level in upper reservoir 311 the upper piston aperture 322 aligns with the upper reservoir aperture 320 allowing fluid to flow therethrough. Similarly when the pressure is below a threshold level in lower reservoir 312 the lower piston aperture 323 aligns with the lower reservoir aperture 321 allowing fluid to flow therethrough.

When the force of the fluid pressure on either piston 315 and 316 is below that of the biasing force of either spring 318 and 319, the valve 310 is in an open position and fluid can flow through the valve. The support is arranged such that if a leg (not illustrated) rests upon a surface such as the ground, the mass of the table increases the pressure in the fluid in the reservoir associated with that leg forcing the piston associated with that leg to move to cover the associated aperture.

In FIG. 23, if the fluid in one adjustable leg is linked to the lower reservoir 312 and this leg is lifted, so that it no longer takes load, the fluid pressure between the lower piston 316 and the leg decreases. The tension of the spring 319 is set so that a pressure decrease will result in the lower piston 316 moving such that the lower piston aperture aligns with the lower reservoir aperture in the ceramic disk 313. This acts to allow fluid transfer between each of the legs. If, alternately, the leg associated with the upper reservoir 311 is lifted the fluid pressure between the upper piston 315 and the associated leg decreases, allowing the upper piston 315 to move to open the upper reservoir aperture 322.

FIG. 24 shows a valve element 330 of a support element for supporting a structure according to a yet another embodiment of the invention. The valve element 330 is positioned between two support elements (not illustrated). The valve element 330 comprises an upper fluid reservoir 331 and a lower fluid reservoir 332. An upper gel element 333 is associated with upper reservoir 331 while a lower gel element 334 is associated with the lower reservoir 332. The gel elements 333 and 334 are shaped such that a force imbalance is created between the two sides of a gel element. Outside edges 335 and 336 of the gel elements have a greater surface area than the inner edges 337 and 338 have. If the pressure in upper reservoir 331 increases, the pressure on the outer edge 335 of upper gel element 333 produces a force imbalance resulting in the gel element 333 deforming to decrease the fluid flow between upper reservoir 331 and lower reservoir 332. The valve element 330 is adapted such that when both the lower reservoir 332 and upper reservoir 331 are above a certain pressure, the lower gel element 334 and upper gel element 333 deform to abut one another, preventing fluid flow between the lower reservoir 332 and the upper reservoir 331. If either the lower reservoir 332 or upper reservoir 331 loses pressure, the associated gel element will spring back to allow fluid to flow between the upper reservoir 331 and lower reservoir 332.

The valve element 330 is arranged such that the fluid in one adjustable leg is linked to the lower reservoir 332 while the fluid in a second adjustable leg (not illustrated) is linked to the upper reservoir 331. Hence if one leg is lifted, so that it no longer takes load, fluid transfer between each of the legs is allowed.

Figure 25:
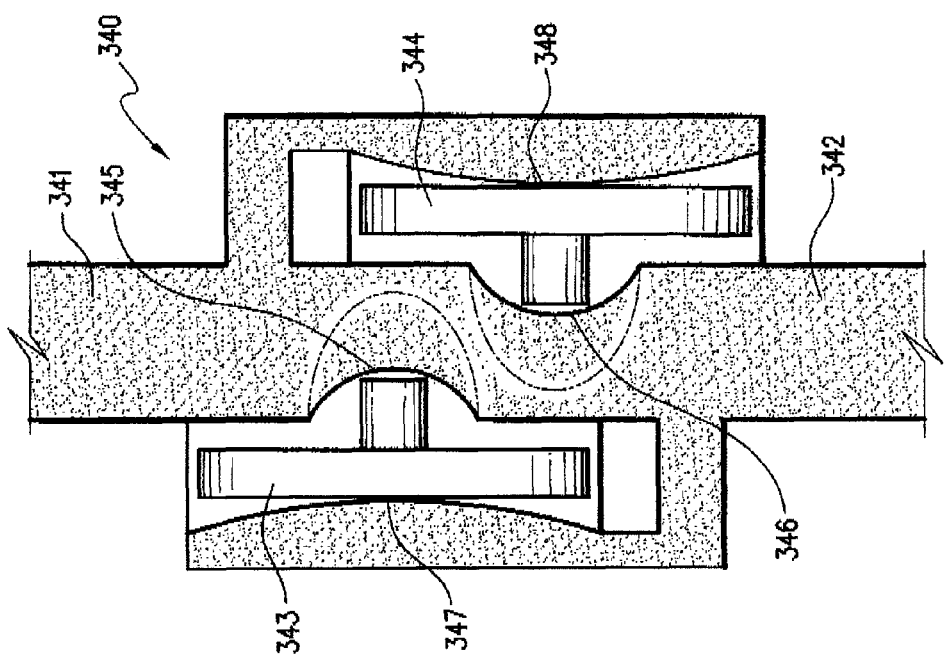
FIG. 25 shows a schematic representation of a valve element according to an embodiment of the present invention.

FIG. 25 shows a valve element 340 of a support element for supporting a structure according to a yet another embodiment of the invention. The valve element 340 is positioned between two support elements (not illustrated). The valve element 340 comprises an upper reservoir 341 and a lower reservoir 342. An upper piston 343 is associated with upper reservoir 341 such that an increase in pressure in upper reservoir 341 impacts upper piston 343. Similarly, a lower piston 344 is associated with upper reservoir 342 such that an increase in pressure in lower reservoir 342 impacts lower piston 344. Each piston 343 and 344 is disposed between an inner membrane 345 and 346 and an outer membrane 347 and 348. The upper piston 343 and membranes 345 and 347 and lower piston 344 and membranes 346 and 348 are shaped such that an increase in pressure in the corresponding reservoir impacts the outer membrane 347 and 348 more than the inner membranes 345 and 346. A force imbalance is created between the two sides of each piston. As a result, if the pressure in upper reservoir 341 increases, the pressure on the outer edge of upper piston 343 produces a force imbalance resulting in the piston 343 moving inwards to decrease the fluid flow between upper reservoir 341 and lower reservoir 342.

The valve element 340 is adapted such that when both the lower reservoir 342 and upper reservoir 341 are above a certain pressure, the inner membrane 346 of lower piston 344 and the inner membrane 345 of upper piston 343 abut one another, preventing fluid flow between the lower reservoir 342 and the upper reservoir 341. If either the lower reservoir 342 or upper reservoir 341 loses pressure, the associated piston will spring back to allow fluid to flow between the upper reservoir 341 and lower reservoir 342.

The valve element 340 is arranged such that the fluid in one adjustable leg is linked to the lower reservoir 342 while the fluid in a second adjustable leg (not illustrated) is linked to the upper reservoir 341. Hence if one leg is lifted, so that it no longer takes load, fluid transfer between each of the legs is allowed.

Figure 26:
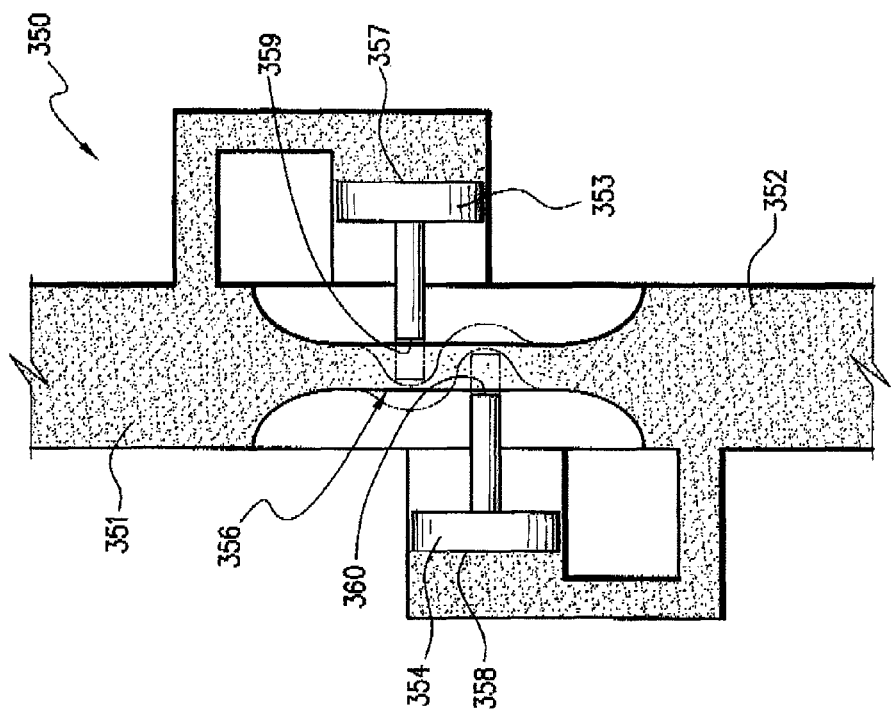
FIG. 26 shows a schematic representation of a system using the embodiment of FIG. 25.

FIG. 26 shows a valve element 350 of a support element for supporting a structure according to a yet another embodiment of the invention. The valve element 350 is positioned between two support elements (not illustrated). The valve element 350 comprises an upper reservoir 351 and a lower reservoir 352. An upper piston 353 is associated with upper reservoir 351 such that an increase in pressure in upper reservoir 351 impacts upper piston 353. Similarly, a lower piston 354 is associated with upper reservoir 352 such that an increase in pressure in lower reservoir 352 impacts lower piston 354. Each piston 353 and 354 is disposed on one side of a deformable membrane tube 356 which allows fluid communication between upper reservoir 351 and lower reservoir 352. The upper piston 353 and lower piston 354 are shaped to have an outer edge 357 and 358 which is broader than the piston's inner edge 359 and 360. Hence an increase in pressure in the corresponding reservoir impacts the outer edge 357 and 358 more than the inner edge 359 and 360. A force imbalance is created between the two sides of each piston. As a result, if the pressure in upper reservoir 351 increases, the pressure on the outer edge of upper piston 353 produces a force imbalance resulting in the piston 353 moving inwards to decrease the fluid flow through the deformable membrane tube 356 between upper reservoir 351 and lower reservoir 352.

The valve element 350 is adapted such that when both the lower reservoir 352 and upper reservoir 351 are above a certain pressure, the deformable membrane tube prevents fluid flow between the lower reservoir 352 and the upper reservoir 351. If either the lower reservoir 352 or upper reservoir 351 loses pressure, the associated piston will spring back to allow fluid to flow between the upper reservoir 351 and lower reservoir 352.

The valve element 350 is arranged such that the fluid in one adjustable leg is linked to the lower reservoir 352 while the fluid in a second adjustable leg (not illustrated) is linked to the upper reservoir 351. Hence if one leg is lifted, so that it no longer takes load, fluid transfer between each of the legs is allowed.

Figure 27:
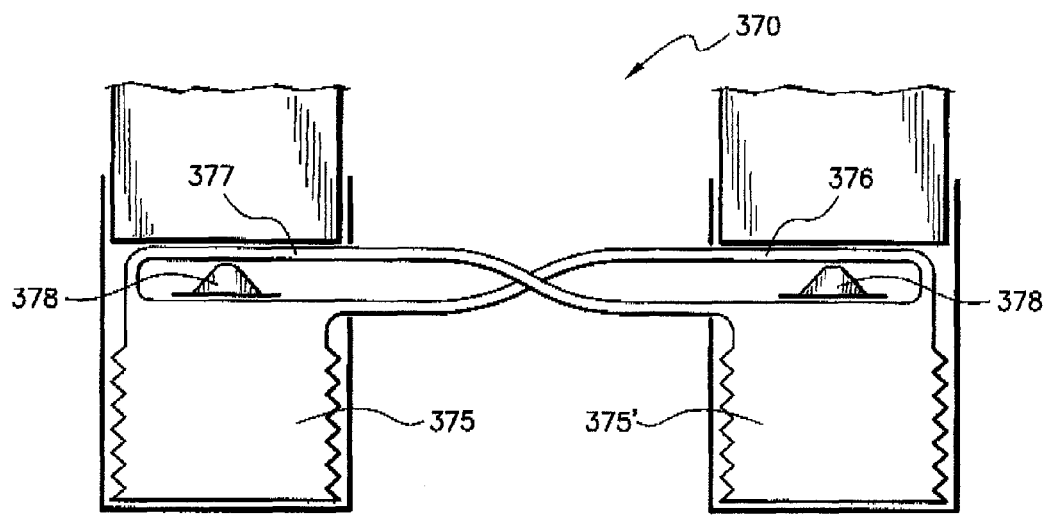
FIG. 27 shows a schematic representation of a system with a valve.
Figure 28:
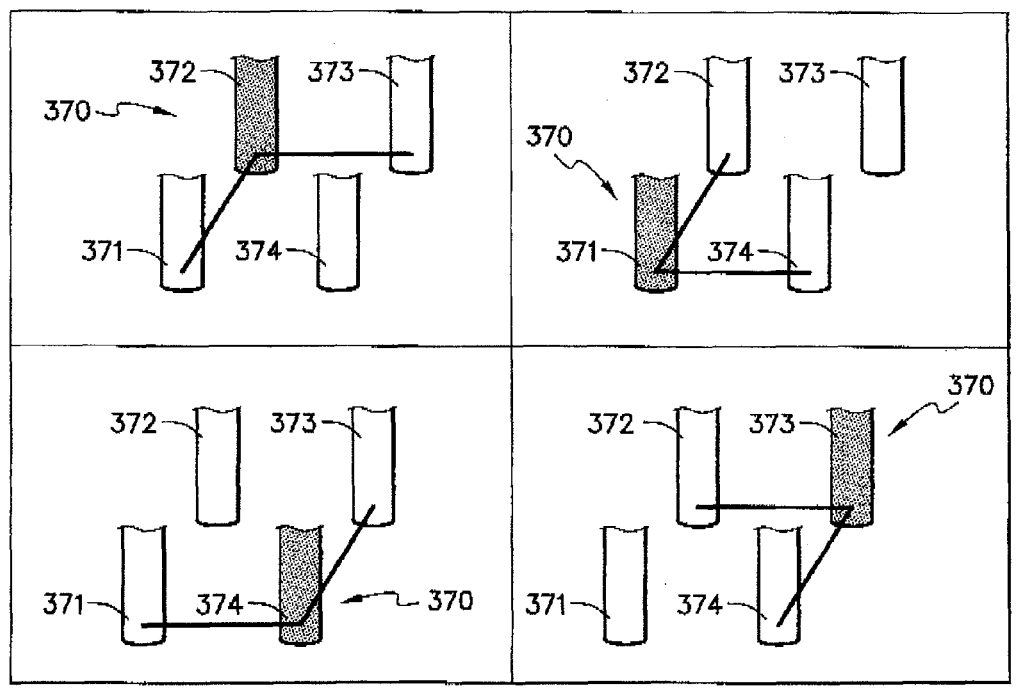
FIG. 28 shows a schematic representation of a support having four support structures.

FIGS. 27 and 28 show a valve element 370 of a support element for supporting a structure according to a yet another embodiment of the invention. In this embodiment, each leg 371-374 being supported includes a fluid bladder 375 and 375'. When pressurised the fluid bladders 375 take the load of the table leg. Each bladder 375 has two hose connections 376 and 377 allowing fluid transfer between the fluid bladders 375. The hoses 376 and 377 extend between the fluid bladders 375 such that for any given fluid bladder, one hose connection is controlled by a valve 378 and the other hose connection is open to the bladder.

In the case of a support with two bladders 375 the hoses 376 and 377 are connected in cross over style as shown in FIG. 5. That is, the hose 377 on one leg, connected via the valve 378, is connected directly to the bladder on the other leg without a valve, and vice versa. With this connection arrangement, when both valves are closed, no fluid transfer occurs, and when either valve is open fluid transfer can occur.

In a four bladder arrangement each bladder is connected to its two closest neighbours. FIG. 6 shows the connections between the legs. Each leg is connected to two other legs, but not to the diagonally opposite leg. Thus if the leg 372 is not on the ground taking load, it can draw fluid from the two neighbouring connected legs, but not the diagonally opposite leg. Further, if more than one leg is lifted from the ground, all lifted legs can receive fluid from the legs taking load.

The valve 378 is a tube pinch valve which acts to block fluid transfer tube when weight is placed on the table leg. If all feet are touching the ground, each bladder is pressurised and can support weight from the table. As a result the table weight acts to pinch the transfer tubes closed so that no fluid flow can occur. If a foot is lifted from the ground, that unit no longer takes any weight from the table and the pressure from the other connected bladders will force the valve 378 to move away from the upper tube and allow fluid flow through the upper tube, thus extending the leg until it touches the ground and starts to take some of the table weight.

FIGS. 29 and 30 show a support element incorporated into a helicopter landing structure 380. The helicopter landing structure 380 comprises two or more independent landing struts 382. Each landing strut 382 incorporates one or more support elements 400. In the case where one landing strut 382 incorporates more than one support element 400, the landing strut may be divided such that in use there are four or more independent landing elements.

The support element 400 comprises a cylinder 402 in which a piston 404 is guided. The piston 404 is attached to the helicopter landing strut 382 such that movement of the landing structure 382 correlates with movement of the piston 404. The cylinder 402 has a fluid inlet/outlet opening 406 for receiving and ejecting fluid 408, such as a hydraulic liquid or water. The fluid 408 is contained in a bladder 409. The fluid inlet/outlet 406 is connected to another such fluid inlet/outlet of another support element (not shown).

The support element 400 further comprises braking means 384.

In use, upon the helicopter (not illustrated) landing on an uneven surface, the support element 400 typically adjusts for the surface and fluid 408 will flow between the cylinder 402 and the cylinder of another support element (not shown) associated with a separate landing strut (not shown). The fluid 408 will flow until the loading associated with the structure acts to increase the fluid pressure within the cylinder 402 above a threshold pressure and the braking means 384 act to retain the piston 404 in a stationary position relative to the cylinder 402. Consequently, the helicopter landing structure 380 will then have a stable position. This increases the safety of helicopter landings.

The support shown in FIGS. 1A and 1B can also be used for a level adjustment for furniture or white goods. For example, the structure 16 may be a refrigerator supported by four support elements such as support element 12 and 14. If the refrigerator is tilted backwards, the pistons of the rear support elements move upwards and push hydraulic liquid into the cylinders of the front support elements and the pistons of the front support elements move in a downward direction. Once the refrigerator is released, the refrigerator will stay in the adjusted position and the weight of the refrigerator will cause the brakes of each support element to engage the respective piston with the respective cylinder.

The cylinder and pistons may be composed of a metallic material such as aluminium or steel. Alternatively, the pistons and cylinders may also be composed of a suitable plastics material. The inlet/outlets of the support elements typically are interconnected using a suitable rubber hose, but may also be interconnected using a plastics or metallic hose.

The internal diameter of the hose and also additional valves may be used to control the throughput of the hydraulic liquid through the hose and therefore the sensitivity (reaction speed) of the support for adjusting for changed loading conditions. The inlet/outlets may also be interconnected via a reservoir.

Although the invention has been described with reference to particular examples, it will be appreciated by those skilled in the art that the invention may be embodied in many other forms. For example, the cylinder of each support element may comprise braking means that has parts which move against a side portion of the piston. Further, the cylinder of each support element may comprise a surface contact portion and the piston may be arranged to be connected to the structure. In addition, it is to be appreciated that the pistons and cylinders may be composed of any suitable material and may be of any suitable shape.

Further, the support may only comprise one support element. For example, the support may be a single supporting member, such as a prop for supporting a building structure, which is compressible and has a braking means which engage above a predetermined loading so that the supporting member can support the structure.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A support for supporting a structure on a surface, the support comprising at least one support element, the or each support element comprising:
   a piston,
   a cylinder in which the piston is moveable, and
   a brake which is adapted to engage the piston in a position that is stable relative to the cylinder,
   wherein the piston and the cylinder are arranged so that a loading associated with the structure effects an adjustment of the support element,
   and wherein an increase in hydraulic pressure within the cylinder, effected by the loading associated with the structure, activates the brake.

2. A support as claimed in claim 1 wherein the cylinder has a fluid inlet/outlet and is arranged so that an amount of fluid flowing through the or each inlet/outlet controls the movement of the or each piston relative to the or each cylinder.

3. A support as claimed in claim 2 wherein the movement of the or each piston effects a movement of a surface contact portion of the or each support element relative to the surface.

4. A support as claimed in claim 3 comprising at least two support elements, each of the support elements having a surface contact portion and wherein the fluid inlet/outlets are interconnected by at least one fluid conduit so that the fluid can flow between the inlet/outlets.

5. A support as claimed in claim 4 being arranged so that in use, when the support is placed on the surface and at least one of the surface contact portions does not contact the surface, a movement of the pistons relative to the cylinders is effected that adjusts the positions of the surface contact portions relative to the surface.

6. A support as claimed in claim 5 wherein each piston comprises each surface contact portion arranged to contact the surface.

7. A support as claimed in claim 5 wherein each surface contact portion is a component that is either in direct or indirect contact with each piston.

8. A support as claimed in claim 5 being arranged so that the pistons move relative to the cylinders, until an increase of fluid pressure in the cylinders actuates the brake.

9. A support as claimed in claim 1 wherein the brake of each support element is hydraulic.

10. A support as claimed in claim 9, wherein the piston of each support element has a cavity arranged so that in use fluid can penetrate from the inlet/outlet into the cylinder and into the cavity.

11. A support as claimed in claim 10 wherein the piston of each support element is elongate and at least one side portion has at least one recess that is linked to the cavity.

12. A support as claimed in claim 11 wherein a brake-pad or brake-cylinder is positioned in the or each recess of each piston and arranged so that if fluid penetrates into the cavity the or each brake-pad or brake-cylinder is in use moved towards an interior wall of the cylinder.

13. A support as claimed in claim 12 wherein the brake is arranged so that an increase of the fluid pressure in the cavity increases the pressure of the or each brake-pad or brake-cylinder against the interior wall of the cylinder and thereby acts against the moveability of each piston in the cylinder.

14. A support as claimed in claim 9 wherein the cylinder has at least one recess in an interior side wall and at least one brake pad or brake cylinder is positioned in the or each recess of the interior side wall and arranged to push against the piston to act against the moveability of the piston in the cylinder.

15. A support as claimed in claim 1 wherein the brake of each support element is mechanical.

16. A support as claimed in claim 15 comprising a brake portion which is moveable relative to the cylinder and with the piston until a movement of a surface contact portion is restricted.

17. A support as claimed in claim 16, wherein the brake portion is arranged so that, when the movement of the brake portion is restricted, a further movement of the piston relative to the cylinder activates the brake.

18. A support of claim 17, wherein the brake has wedging portions which in use effect a movement of the brake portion against an interior wall of the cylinder.

19. A support as claimed in claim 1 having three support elements.

20. A support as claimed in claim 1 having four support elements.

21. A support as claimed in claim 1 wherein the structure is a furniture item.

22. A support as claimed in claim 1 wherein the structure is a table.

23. A support as claimed in claim 1, wherein the brake is situated between two or more support elements and comprises at least two fluid reservoirs adapted such that when the pressure in at least one fluid reservoir is below a threshold level the fluid reservoirs are in fluid communication and when the pressure in at least two fluid reservoirs is above a threshold level the fluid reservoirs are not in fluid communication.

24. A support as claimed in claim 23, further comprising a valve disposed between the fluid reservoirs.

25. A support as claimed in claim 24, wherein the valve comprises:
   a ceramic disk disposed between the reservoirs, the ceramic disk including at least one reservoir aperture;
   at least two pistons, each piston being associated with a reservoir, each piston including a piston aperture, each piston being biased such that when the pressure in any reservoir is below a threshold level the piston aperture aligns with the reservoir aperture allowing fluid to flow therethrough and when the pressure in all reservoirs is above a threshold level the piston.

26. A support as claimed in claim 24, wherein the valve comprises:
   at least two sealing elements, each sealing element being associated with a reservoir, wherein the sealing elements are shaped such that a change in pressure results in relative movement of the sealing elements with respect to one another such that if the pressure in all reservoirs is above a threshold level the sealing elements abut, preventing fluid flow between the reservoirs.

27. A support as claimed in claim 26, wherein the sealing elements are composed of gel.

28. A support as claimed in claim 27, wherein the sealing elements are pistons.

29. A support as claimed in claim 28, wherein the pistons are disposed between membranes.

30. A braking system for a piston and cylinder assembly, the braking system comprising a brake adapted to be actuated by an increase in fluid pressure within the cylinder, wherein the piston has a cavity arranged so that in use fluid can penetrate from an inlet/outlet into the cylinder and into the cavity and wherein at least one side portion of the piston has at least one recess that is linked to the cavity, and wherein a brake-pad or brake-cylinder is positioned in the or each recess of the piston and arranged so that if fluid penetrates into the cavity the or each brake-pad or brake-cylinder is in use moved towards an interior wall of the cylinder.

31. A braking system as defined in claim 30, wherein the brake is arranged so that an increase of the fluid pressure in the cavity increases the pressure of the or each brake-pad or brake-cylinder against the interior wall of the cylinder and thereby acts against the moveability of the piston in the cylinder.

32. A support for supporting a structure on a surface, the support comprising at least one support element, the or each support element comprising:
   a piston,
   a cylinder in which the piston is moveable, and
   a brake for maintaining the piston in a position that is stable relative to the cylinder,
   wherein the piston and the cylinder are arranged so that a loading associated with the structure effects an adjustment of the support element,
   and wherein the loading associated with the structure activates the brake if the moveability of a surface contact portion of the support element is reduced below a threshold value.

* * * * *